(12) United States Patent
Nishikitani et al.

(10) Patent No.: US 6,657,768 B2
(45) Date of Patent: Dec. 2, 2003

(54) ELECTROCHROMIC DEVICE

(75) Inventors: Yoshinori Nishikitani, Yokohama (JP); Masaaki Kobayashi, Yokohama (JP); Hiroshi Imafuku, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 10/138,661

(22) Filed: May 3, 2002

(65) Prior Publication Data

US 2002/0136898 A1 Sep. 26, 2002

Related U.S. Application Data

(63) Continuation of application No. 09/459,558, filed on Dec. 13, 1999, now abandoned.

(30) Foreign Application Priority Data

Dec. 14, 1998 (JP) ............................................. 10-355126

(51) Int. Cl.$^7$ ................................................. G02F 1/15
(52) U.S. Cl. ...................... 359/265; 359/270; 359/273; 428/457; 428/704; 428/702; 428/425.9; 428/411.1; 428/469; 428/689; 428/500; 252/582; 252/583; 252/586

(58) Field of Search ................................. 359/265, 270, 359/273; 428/457, 704, 702, 425.9, 411.1, 469, 689, 500; 252/582, 583, 586

(56) References Cited

U.S. PATENT DOCUMENTS 5,910,854 A  6/1999  Varaprasad et al.

FOREIGN PATENT DOCUMENTS

EP  0 612 826 A1  8/1994

*Primary Examiner*—Deborah Jones
*Assistant Examiner*—Ling Xu
(74) *Attorney, Agent, or Firm*—Akin Gump Strauss Hauer & Feld, L.L.P.

(57) ABSTRACT

The electrochromic devices have an ion conductive layer formed by curing a composition comprising a bipyridinium compound represented by the formula $$H_2C=C-\left(\begin{array}{c}R^1\\|\\C-O\\||\\O\end{array}\right)_a R^2-{}^+N\text{-}\underset{X^-}{\bigcirc}\text{-}\underset{Y^-}{\bigcirc}N^+-R^3 \qquad (1)$$

a specific metallocene compound and a precursor of a polymeric solid electrolyte, between two electrically conductive substrates, at least one of which is transparent.

10 Claims, 1 Drawing Sheet

ELECTROCHROMIC DEVICE

CROSS-REFERENCE TO RELATED APPLICATIONS

This is a continuation of co-pending U.S. application Ser. No. 09/459,558 filed Dec. 13, 1999, now abandoned.

BACKGROUND OF THE INVENTION

This invention relates to electrochromic devices which have an extensive use varied from transmission-type devices such as smart windows, reflective-type devices such as antiglare mirrors for automobiles, reflective-type devices such as decorative mirrors to displays.

A method of forming a chromogenic layer for an electrochromic device is known from Japanese Laid-Open Patent Publication No. 63-18336 disclosing a method in which a film of chromogenic layer is formed by vacuum-epaporation or sputtering an inorganic oxide such as tungsten oxide ($WO_3$) over a transparent electrically conductive film. However, this method requires techniques carried out under vacuum conditions, which lead to elevated production costs.

BRIEF SUMMARY OF THE INVENTION

After an extensive research and study, it has been found that the foregoing disadvantage can be overcome by providing an electrochromic device having a structure described below.

According to one embodiment of the present invention, there is provided an electrochromic device having an ion conductive layer obtained by curing a composition containing (A) a bipyridinium compound represented by formula (1), (B) a metallocene compound represented by formula (2) or (2') and (C) a precursor of a polymeric solid electrolyte, disposed between two electrically conductive substrates at least one of which is transparent, formula (1) being

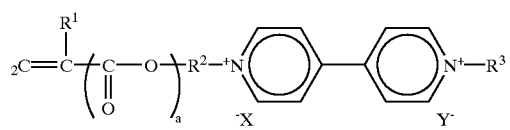

(1)

wherein $X^-$ and $Y^-$ may be the same or different and are each independently a counter anion selected from the group consisting of an halogen anion, $ClO_4^-$, $BF_4^-$, $PF_6^-$, $CH_3COO^-$ and $CH_3(C_6H_4)SO_3^-$, $R^1$ is hydrogen or a $C_1$–$C_5$ alkyl group, $R^2$ is a $C_1$–$C_{30}$ divalent hydrocarbon residue, $R^3$ is a $C_1$–$C_{20}$ hydrocarbon residue and a is an integer of 0 or 1; formulae (2) and (2') being

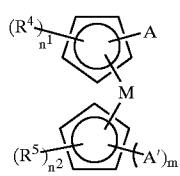

(2)

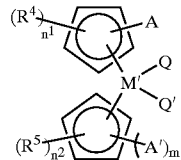

(2')

wherein $R^4$ and $R^5$ are each independently a hydrocarbon group selected from the group consisting of $C_1$–$C_{10}$ alkyl, alkenyl and aryl groups, if $R^4$ or $R^5$ is an aryl group, the aromatic ring may form a condensation ring by bonding to a cyclopentadienyl ring, $n^1$ is an integer of $0 \leq n^1 \leq 4$, $n^2$ is an integer of $0 \leq n^2 \leq 5$, A and A' may be the same or different and are each independently a monovalent group, m is 0 or 1, M is selected from the group consisting of Cr, Co, Fe, Mg, Ni, Os, Ru and V, M' is selected from the group consisting of Hf, Mo, Nb, Ti, V and Zr and Q and Q' may be the same or different and each are independently hydrogen, halogen and a $C_1$–$C_{12}$ alkyl group;

formula (A) being

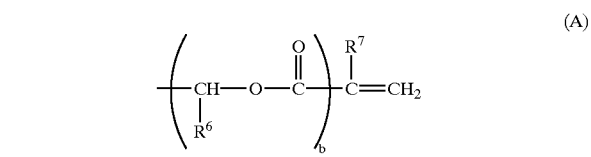

(A)

wherein $R^6$ is hydrogen or methyl group, $R^7$ is hydrogen or methyl group, b is 0 or 1 and provided that $R^7$ is hydrogen if b is 0.

According to the other embodiment of the present invention, there is provided an electrochromic device having an ion conductive layer obtained by curing the composition further containing (D) an ultraviolet absorbing compound having an ethylenic double bond.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
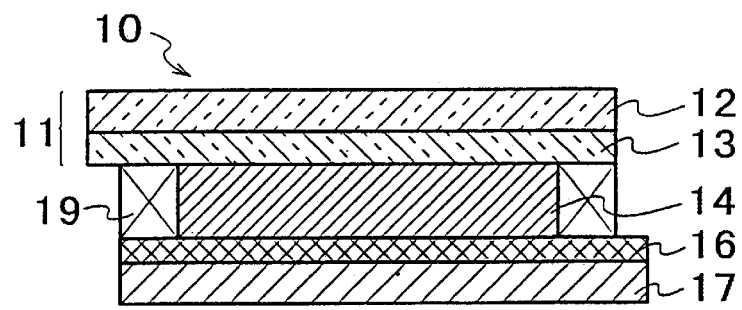
FIG. 1 a cross-sectional view showing the structure of an electrochromic device according to the present invention.

The electrochromic device according to the present invention is formed by a pair of electrically conductive substrates. The term "electrically conductive substrate" refers to a substrate functioning as an electrode. Therefore, the electrically conductive substrates used herein encompass those made from electrically conductive materials and those obtained by laminating an electrically conductive layer over one or both surfaces of a non-electrically conductive substrate. Regardless of whether the substrate is electrically conductive or not, it must have a smooth surface at normal temperatures. The surface, however, may be flat or curved and deformable under stress as well.

At least one of the pair of electrically conductive substrates is transparent and the other may be transparent or opaque or may be a reflective electrically conductive substrate which is capable of reflecting light.

Generally, a device having electrically conductive substrates both of which are transparent is suitable for displays and smart windows, while a device having an electrically conductive transparent substrate and an opaque one is suitable for displays. A device having a transparent electrically conductive substrate and a reflective one is suitable for electrochromic mirrors.

The transparent electrically conductive substrate may be produced by laminating a transparent electrode layer over a transparent substrate. The term "transparent" used herein denotes an optical transmission ranging from 10 to 100 percent.

No particular limitation is imposed on a material of the transparent substrate, which, therefore, may be color or colorless glasses, reinforced glasses or color or colorless transparent resins. Specific examples of such resins are polyethylene terephtalate, polyethylene naphthalate, polyamide, polysulfone, polyether sulfone, polyether etherketone, polyphenylene sulfide, polycarbonate, polyimide, polymethyl methacrylate and polystyrene.

The transparent electrode layer may be a metal thin film of gold, silver, chrome, copper and tungsten or an electrically conductive thin film of metal oxides. Specific examples of the metal oxides are ITO ($In_2O_3$—$SnO_2$), tin oxide, silver oxide, zinc oxide and vanadium oxide. The film thickness is usually within the range of 10 to 500 nm, preferably 50 to 300 nm. The surface resistance of the film is within the range of usually 0.5 to 500 Ω/sq, preferably 1 to 50 Ω/sq. Any suitable method of forming a transparent electrode layer may be employed depending on the type of metals and/or metal oxides forming the electrode. The transparent electrode layer may be formed by vacuum evaporation, ion-plating, sputtering and sol-gel method.

For the purpose of imparting oxidation-reduction capability and electric double layer capacitance and improving electric conductivity, an opaque electrode activator may be partially applied to the surface of the transparent electrode layer. The electrode activator may be a metal such as copper, silver, gold, platinum, iron, tungsten, titanium and lithium, an organic material having oxidation-reduction capability, such as polyaniline, polythiophen, polypyrrole and phthalocyanine, a carbon material such as active carbon and graphite, a metal oxide such as $V_2O_5$, $MnO_2$, $NiO$ and $Ir_2O_3$ and a mixture thereof.

Upon forming the electrode activator over the transparent electrode layer, it is necessary not to harm the transparency thereof excessively. Therefore, the opaque electrode activator may be applied onto an electrode by forming thin stripes or dots of a composition comprising an active carbon fiber, graphite and an acrylic resin over a transparent ITO layer or forming mesh of a composition comprising $V_2O_5$, acetylene black and butyl rubber over a gold thin film.

The opaque electrically conductive substrate may be produced by substituting the transparent substrate of the above-described transparent electrically conductive substrate with an opaque substrate such as various plastics, glasses, woods and stones if the substrate need not be transparent.

Eligible reflective electrically conductive substrates for the present invention are (1) laminates obtained by laminating a reflective electrode layer over a non-electrically conductive transparent or opaque substrate, (2) laminates obtained by laminating a transparent electrode layer over one surface of a non-electrically conductive transparent substrate and a reflective layer over the other surface thereof, (3) laminates obtained by laminating a reflective layer over a non-electrically conductive transparent substrate and a transparent electrode layer over the reflective layer, (4) laminates obtained by laminating a transparent electrode layer over a reflective plate used as a substrate and (5) plate-like substrates which themselves have functions as a photo-reflective layer and an electrode layer.

The term "reflective electrode layer" denotes a thin film which has a mirror surface and is electorchemically stable in performance as an electorde. Specific examples of such a thin film are a metal film of gold, platinum, tungsten, tantalum, rhenium, osmium, iridium, silver, nickel or palladium and an alloy film of platinum-palladium, platinum-rhodium or stainless. Any suitable method of forming such a thin film may be employed such as vacuum evaporation, ion-plating and sputtering.

The substrate to be provided with a reflective electrode layer may be transparent or opaque. Therefore, the substrate may be the above-described transparent substrate and various plastics, glasses, woods and stones which may not be transparent.

The term "reflective plate" or "reflective layer" denotes a substrate having a mirror surface or a thin film which may be a plate of silver, chrome, aluminum, stainless, nickel-chrome or a thin film thereof.

If the above described reflective electrode layer per se is rigid, a substrate may not be needed.

In the present invention, a bipyridinium compound hereinafter referred to as Component (A) is used as an electrochromic material and represented by the formula

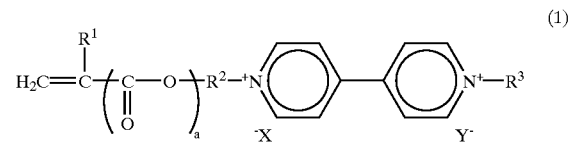

(1)

wherein X- and Y- may be the same or different and are each independently a counter anion selected from the group consisting of an halogen anion, $ClO_4^-$, $BF_4^-$, $PF_6^-$, $CH_3COO^-$ and $CH_3(C_6H_4)SO_3^-$. The halogen anion may be $F^-$, $Cl^-$, $Br^-$ and $I^-$.

$R^1$ may be hydrogen or a $C_1$–$C_5$ alkyl group. Specific examples of the alkyl group are methyl, ethyl, i-propyl, n-propyl, n-butyl, t-butyl and n-pentyl. Preferred are hydrogen and methyl $R^2$ is a $C_1$–$C_{30}$ divalent hydrocarbon group. The term "hydrocarbon residue" used herein refers to hydrocarbon groups and oxygen-containing hydrocarbon groups. The divalent hydrocarbon residues include hydrocarbon groups such as alkylene groups and divalent aromatic hydrocarbon groups as well as divalent oxygen-containing hydrocarbon groups having an ether bond, such as (poly)oxyalkylene groups. The alkylene group are those having 1 to 10, preferably 1 to 5 carbon atoms. Preferred examples of the alkylene group are methylene, ethylene, tetramethylene and propylene groups, among which methylene group is particularly preferred.

Typical examples of the divalent aromatic hydrocarbon groups are $C_6$–$C_{20}$ arylene or substituted arylene groups such as m-phenylene, n-phenylene, substituted phenylene (alkyl-substituted phenylene), biphenylene and naphthylene groups, among which m-phenylene and n-phenylene are preferred.

The oxygen-containing hydrocarbon group may be —OCH$_2$CH$_2$— and —CH$_2$OCH$_2$CH$_2$—.

R$^3$ is a monovalent hydrocarbon residue having 1 to 20, preferably 2 to 10 carbon atoms. The hydrocarbon residue includes hydrocarbon groups and oxygen-containing hydrocarbon groups. Therefore, the monovalent hydrocarbon residue encompasses hydrocarbon groups such as alkyl groups, aryl groups and aralkyl groups and alkoxy groups. Specific examples of the alkyl groups are methyl, ethyl, i-propyl, n-propyl, n-butyl, t-butyl, n-pentyl, n-hexyl, cyclohexyl, n-heptyl, n-octyl, benzyl and vinylbenzyl groups.

Alternatively, R$^3$ in formula (1) may be an oxygen-containing hydrocarbon groups represented by the formula

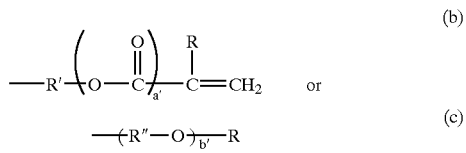

wherein R$^1$ is as defined with respect to R$^2$ in formula (1), R is as defined with respect to R$^1$ in formula (1), R″ is an alkylene group having 2 to 5, preferably 2 to 3 carbon atoms, such as ethylene, trimethylene and propylene groups, a′ is an integer of 0 or 1, b′ is an integer of 1 to 5, preferably 1 or 2.

a in formula (1) is an integer of 0 or 1.

If R$^3$ is an oxygen-containing hydrocarbon group of formula (a), Component (A) has carbon-carbon double bonds at both terminal ends, as represented by the formula

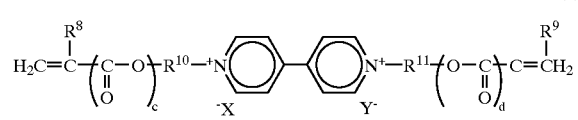

(3)

wherein X- and Y- may be the same or different and are each as defined in formula (1), R$^{14}$ and R$^{17}$ may be the same or different and are each as defined with respect to R$^1$ in formula (1), R$^{15}$ and R$^{16}$ may be the same or different and are each as defined with respect to R$^2$ in formula (1) and d and e may be the same or different and are each as defined with respect to a in formula (1).

Specific examples of Component (A) are as follows:

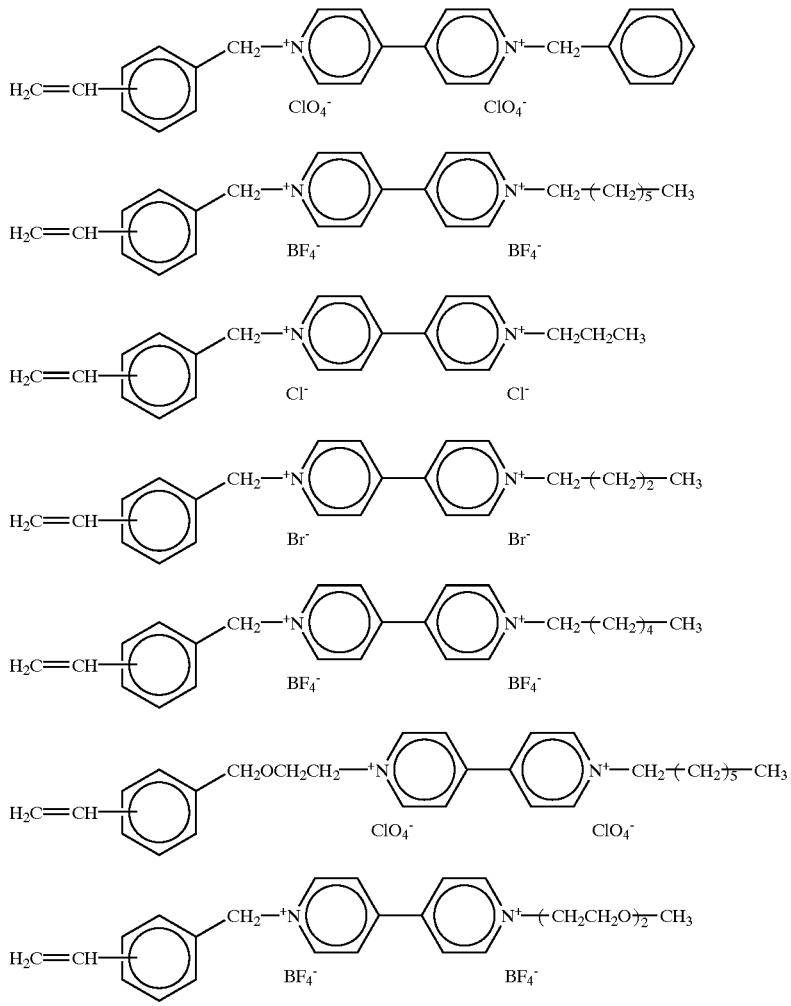

-continued

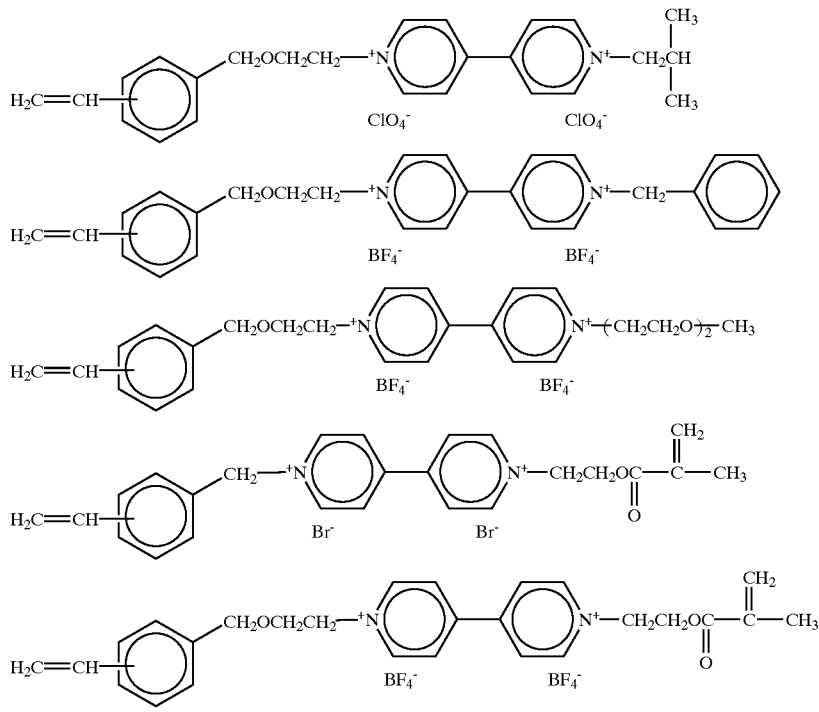

Two or more of these compounds may be used in combination. Component (A) may be used in combination with a compound facilitating color development. The color developing compound may be bonded to Component (A)

In the electrochromic device according to the present invention, a metallocene compound hereinafter referred to as Component (B) and represented by the following formula (2) or (2') is used as a electron donating compound:

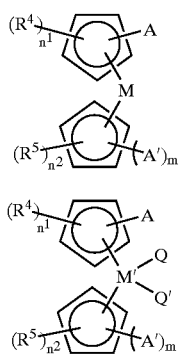

In formulae (2) and (2'), $R^4$ and $R^5$ are each independently a hydrocarbon group selected from an alkyl group having 1 to 10 carbon atoms and an aryl group having 1 to 10 carbon atoms. Specific examples of the alkyl group are methyl, ethyl, i-propyl, n-propyl, n-butyl, t-butyl, n-pentyl, n-hexyl and cyclohexyl groups. Specific example of the aryl group is phenyl group. Preferred for R4 and R5 are methyl, ethyl and propyl groups.

$R^4$ or $R^5$ may form a ring by bonding to a cyclopentadienyl ring or form a group cross-linking a different cyclopentadienyl ring.

$n^1$ is an integer of $0 \leq n^1 \leq 4$ and $n^2$ is an integer of $0 < n^2 < 5$. $n^1$ and $n^2$ are each preferably 0 or 1, and particularly preferably 0.

A and A' may be the same or different and are each independently a monovalent group represented by the formula

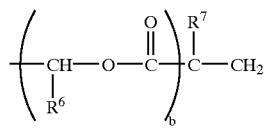

(a)

wherein $R^6$ is hydrogen or methyl group, $R^7$ is hydrogen or methyl group, b is 0 or 1, provided that $R^7$ is hydrogen if b is 0.

m in formulae (2) and (2') is 0 or 1, preferably 0. M denotes Cr, Co, Fe, Mg, Ni, Os, Ru or V. M' denotes Hf, Mo, Nb, Ti, V or Zr. Q and Q' may be the same or different and are each independently hydrogen, halogen or a $C_1$–$C12$ alkyl group.

Specific examples of Component (B) are given below. In the chemical formulae representing the specific examples, R is a $C_1$–$C_3$ alkyl group and $R^1$ is methylene group, ethylene group and a group represented by the formula

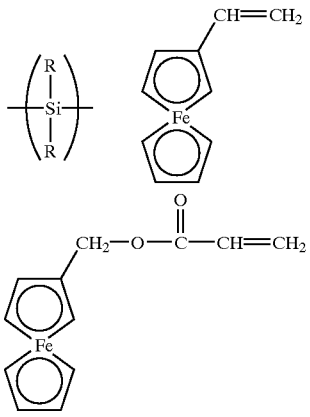

-continued
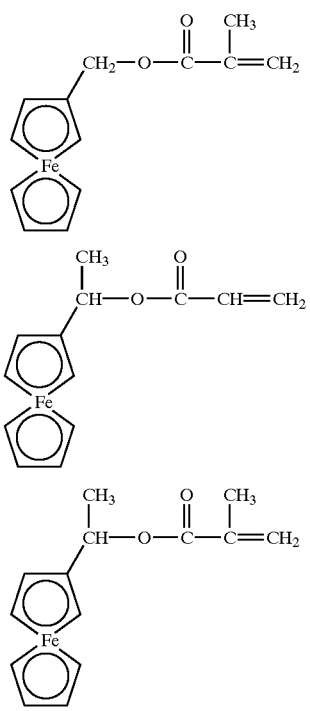
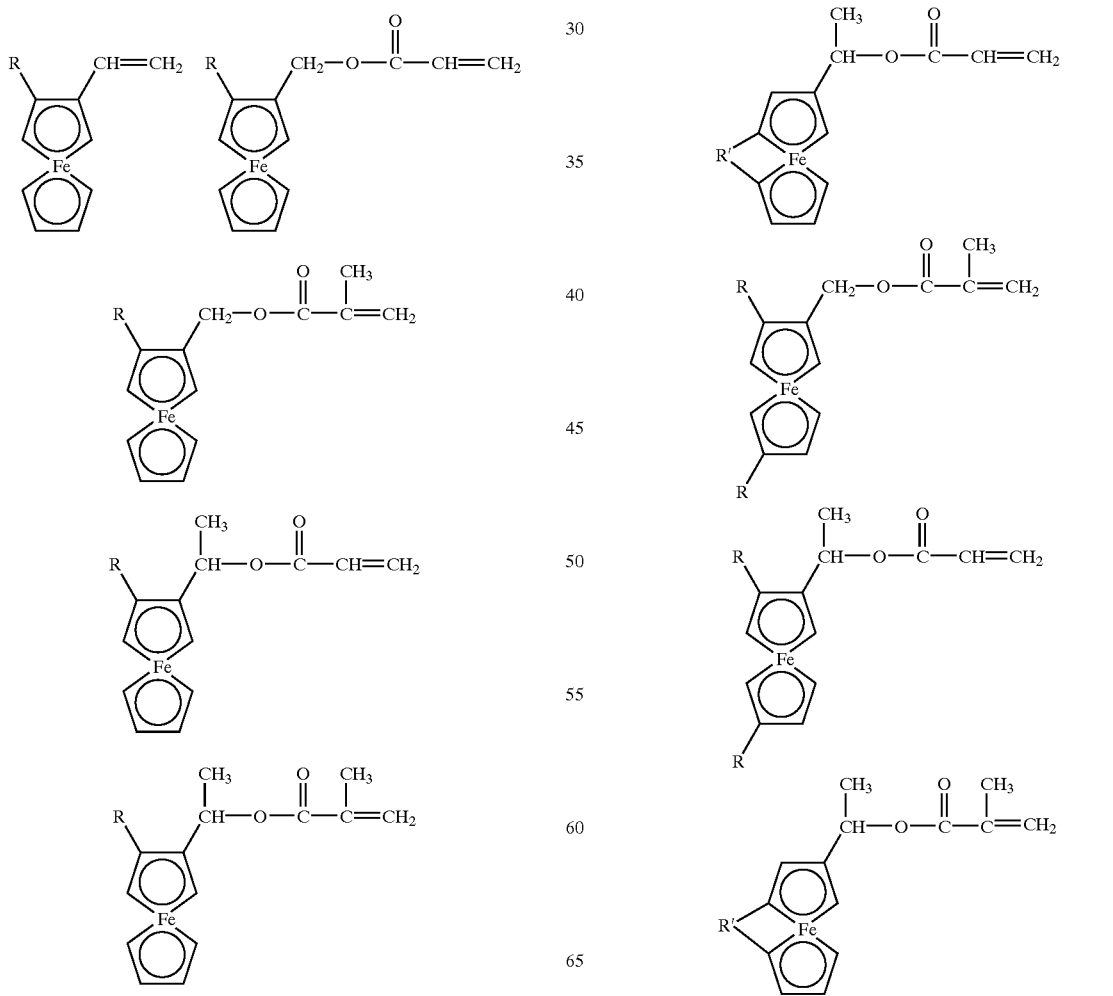

-continued
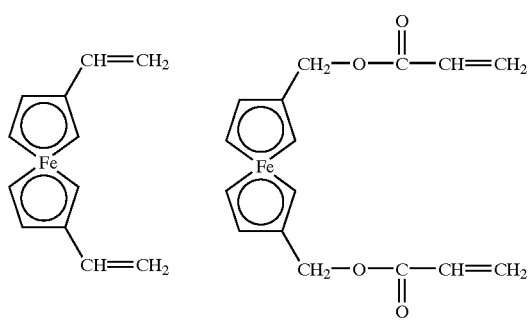
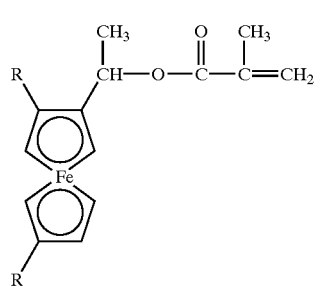
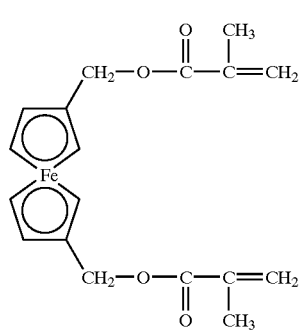
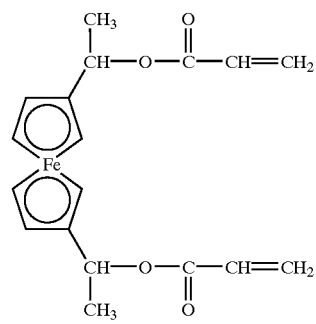
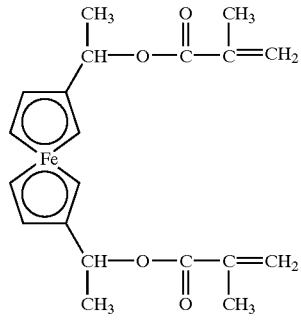
-continued
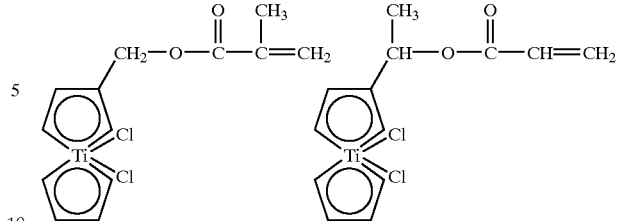
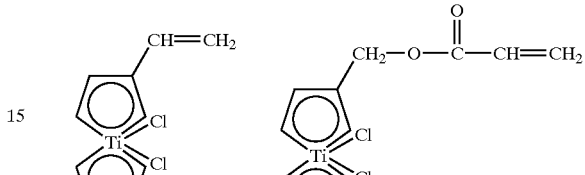
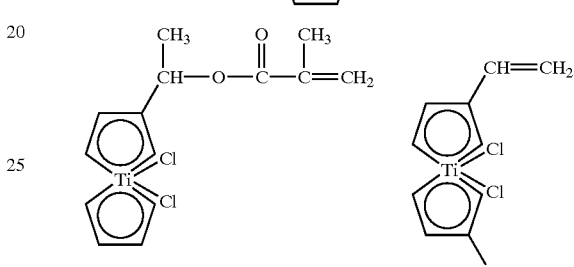
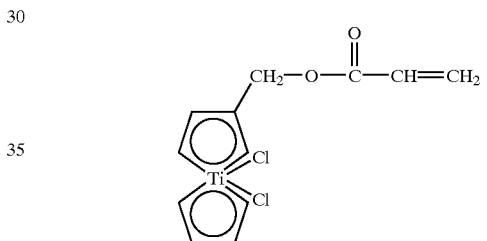
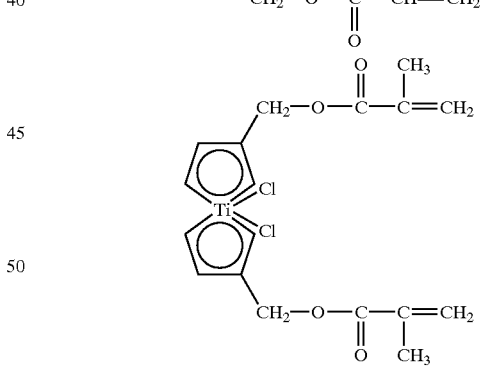
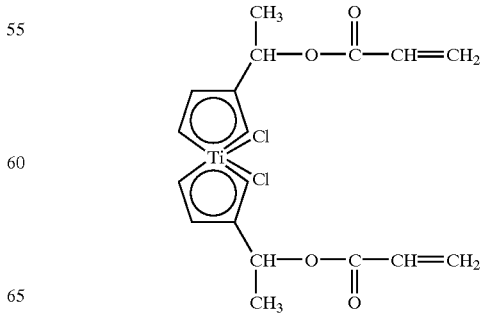

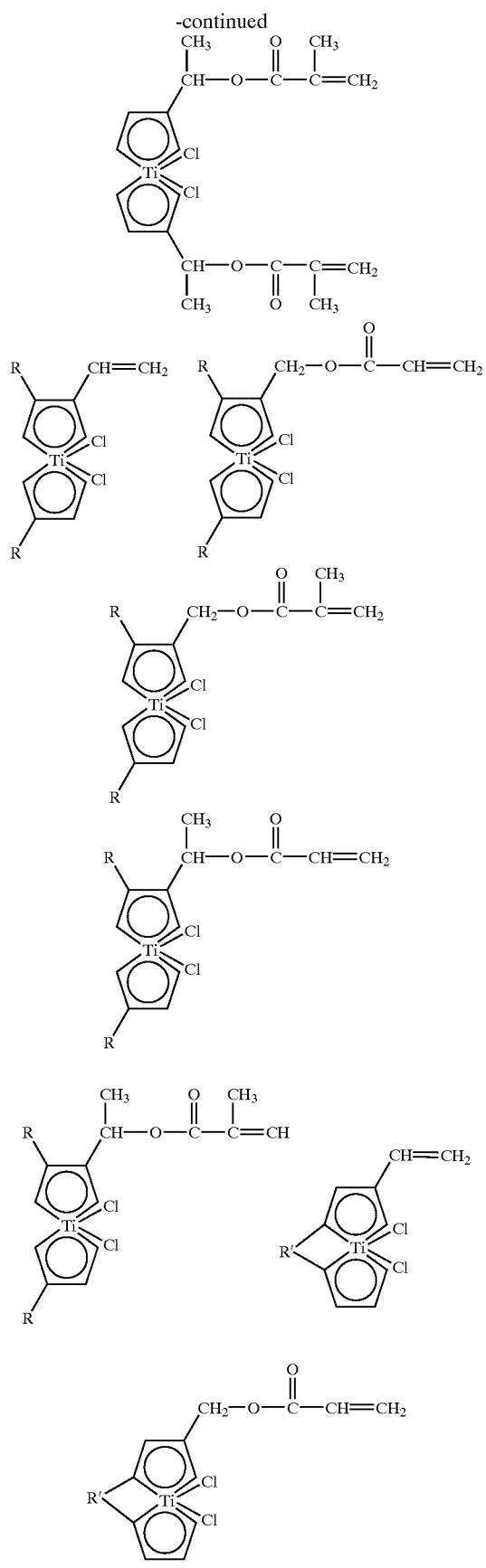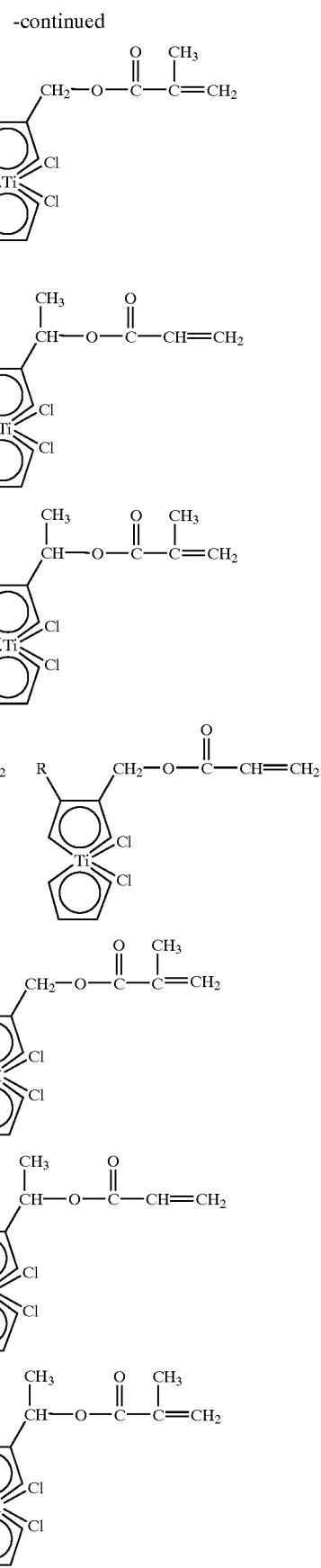

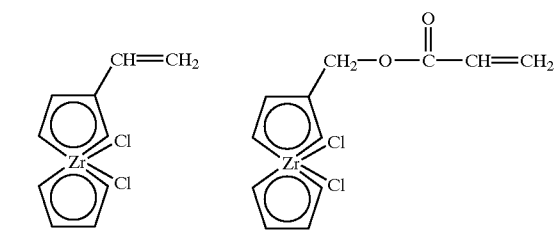
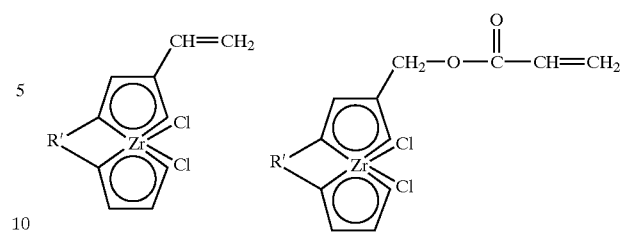
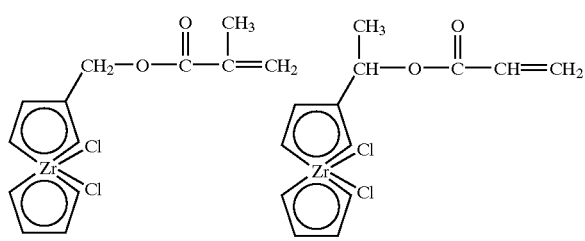
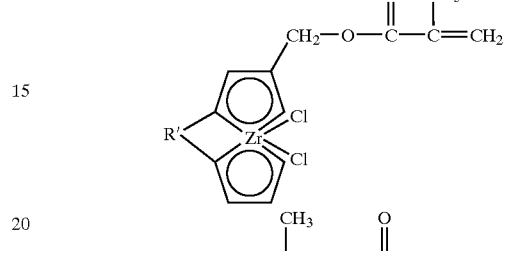
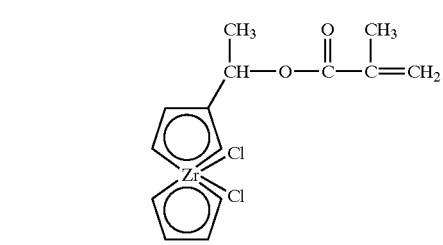
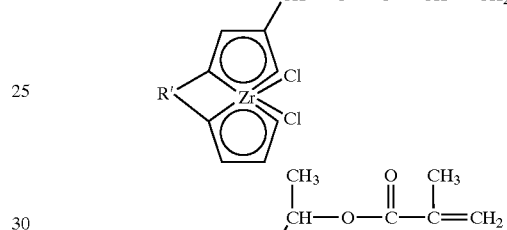
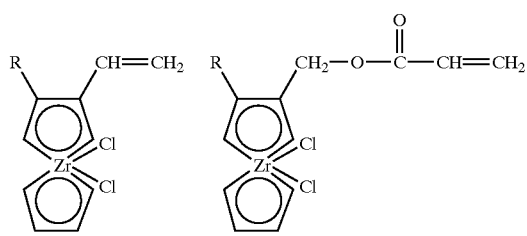
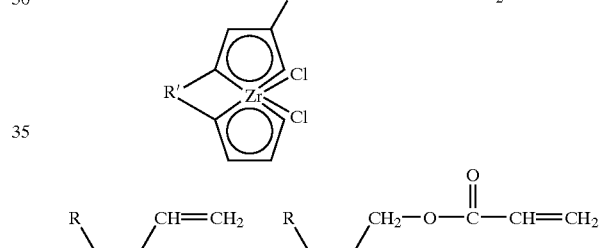
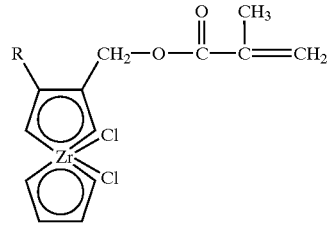
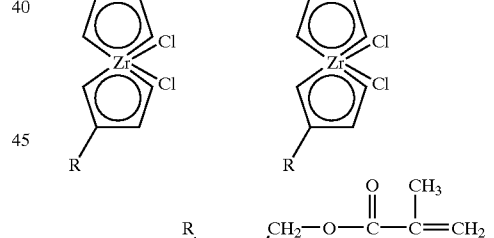
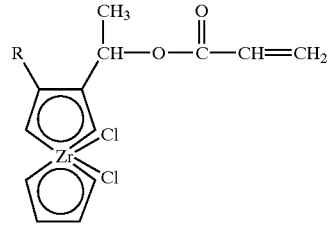
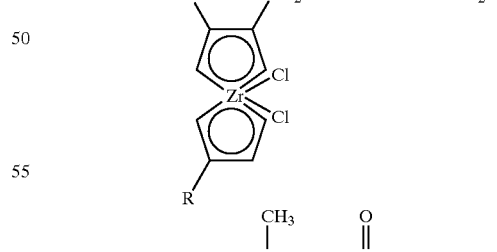
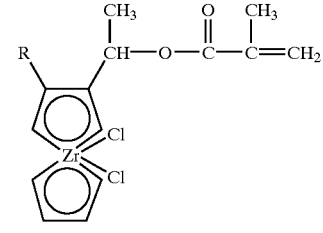
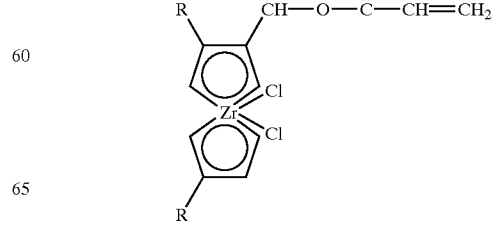

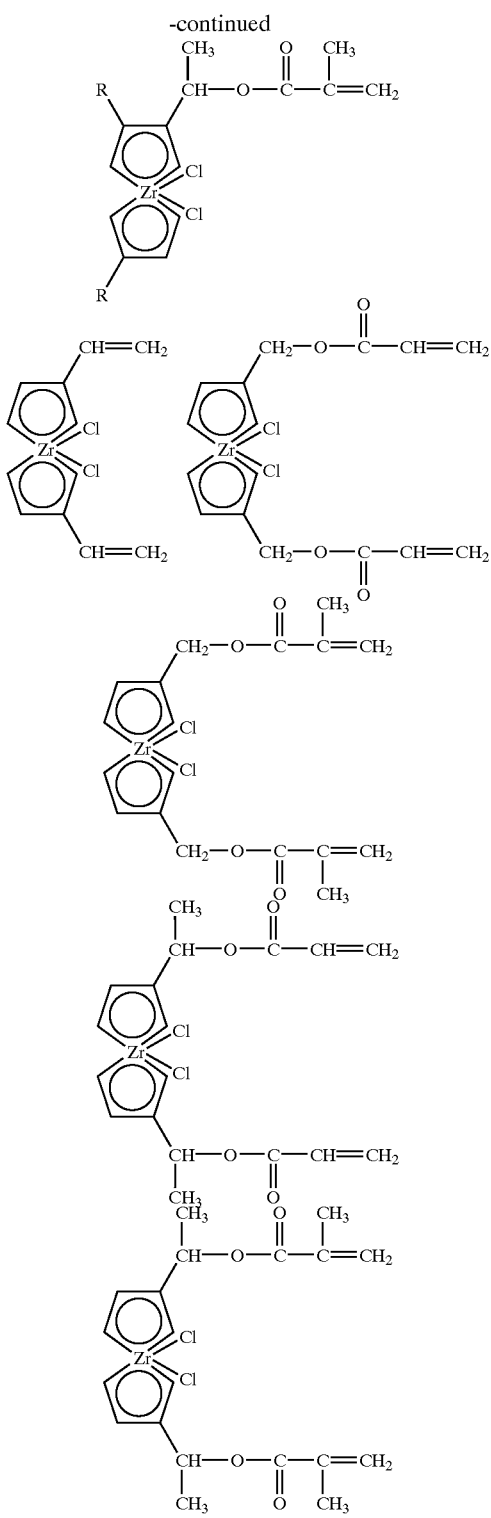

The above exemplified compounds may be used in combination.

Although not restricted, Components (A) and (B) are used in suitable amounts, but are used in an amount of 0.01 to 20, preferably 0.1 to 10 mass percent of a precursor of polymeric solid electrolyte described herein below.

The molar ratio of Component (A) to Component (B) in the ion conductive layer of the present invention is usually 10/1 to 1/20, preferably 2/1 to 1/3.

The term "precursor of a polymeric solid electrolyte" (hereinafter referred to as Component (C)) denotes a component having fluidity which can be converted to a polymeric solid electrolyte by curing. The polymeric solid electrolyte encompasses those which are substantially solid at room temperature and those which are gelatinized and thus exhibit almost no fluidity at room temperature. Regardless of whether the polymeric solid electrolyte is solid or gel, the ion conductivity thereof is usually greater than $1 \times 10^{-7}$ S/cm, preferably greater than $1 \times 10^{-6}$ S/cm and more preferably $1 \times 10^{-5}$ S/cm.

Component (C) is basically composed of a polymeric monomer and a supporting electrolyte and may further contain preferably a solvent and other components as required.

Eligible polymeric monomers are polyurethane monomers, acryloyle- or methacryloyle-modified polyalkyleneoxides, among which acryloyle- or methacryloyle modified polyalkyleneoxides are preferred.

The polyurethane monomer having an acryloyle group or a methacryloyle group at both of the terminal ends is represented by the formula

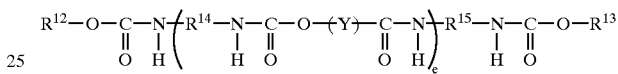 (4)

wherein $R^{12}$ and $R^{13}$ may be the same or different and are each independently a group of formula (5), (6) or (7), $R^{14}$ and $R^{15}$ may be the same or different and are each independently a divalent hydrocarbon group having 1 to 20, preferably 2 to 12 carbon atoms, Y is a polyether unit, a polyester unit, a polycarbonate unit or mixed units thereof, e is an integer of 1 to 100, preferably 1 to 50, more preferably 1 to 20:

formula (5) being

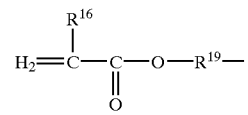 (5)

formula (6) being

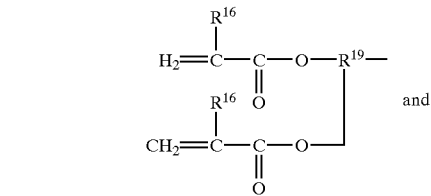 (6)

and formula (7) being

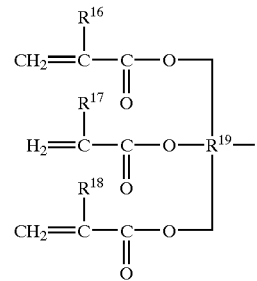 (7)

In formulae (5), (6) and (7), $R^{16}$, $R^{17}$ and $R^{18}$ may be the same or different and are each independently hydrogen or an alkyl group having 1 to 3 carbon atoms and $R^{19}$ is a divalent to quatervalent organic residue having 1 to 20, preferably 2 to 8 carbon atoms.

Specific examples of the organic residue are hydrocarbon residues such as alkyltolyl groups, alkyltetratolyl groups and alkylene groups represented by the formula

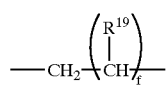

(8)

wherein $R^{20}$ is an alkyl group having 1 to 3 alkyl group or hydrogen, f is an integer of 0 to 6 and if f is greater than 2, $R^{20}$ may be the same or different.

The hydrogen atom in formula (8) may be partially substituted by an alkoxy group having 1 to 6, preferably 1 to 3 carbon atoms and an oxygen-containing hydrocarbon group such as an aryloxy group having 6 to 12 carbon atoms.

Specific examples of $R^{44}$ in formulae (5) to (7) are a methylene group, a tetramethylene group and groups represented by the following:

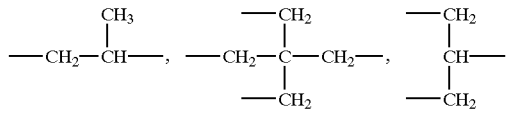

The divalent hydrocarbon group for $R^{14}$ and $R^{15}$ in formula (4) may be exemplified by aliphatic hydrocarbon groups, aromatic hydrocarbon groups and alicyclic hydrocabon groups. The aliphatic hydrocarbon group may be an alkylene group represented by formula (8) above.

The divalent aromatic and alicyclic hydrocarbon groups may be exemplified by hydrocarbon groups represented by the following formulae:

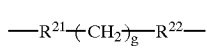

(9)

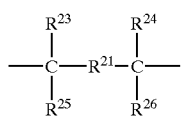

(10)

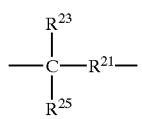

(11)

In formulae (9) through (11), $R^{21}$ and $R^{22}$ may be the same or different and are each independently a phenylene group, a substituted phenylene group (alkyl-substituted phenylene group), a cycloalkylene group and a substituted cycloalkylene group (alkyl-substituted cycloalkylene group), and $R^{23}$, $R^{24}$, $R^{25}$ and $R^{26}$ may be the same or different and are each independently hydrogen or an alkyl group having 1 to 3 carbon atoms and g is an integer of 1 to 5.

Specific examples of $R^{14}$ and $R^{15}$ in formula (4) are the following divalent groups:

-continued

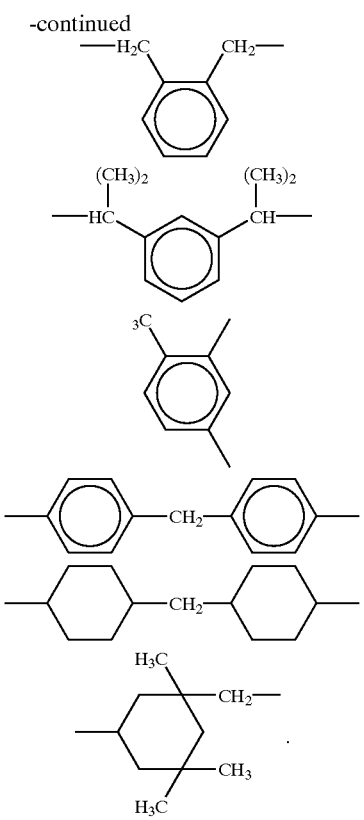

In formula (5), Y indicates a polyether unit, a polyester unit, a polycarbonate unit or mixed units thereof. Each of these units is represented by the following formulae:

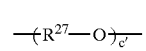

(d)

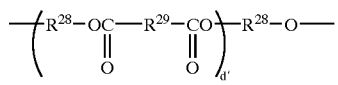

(e)

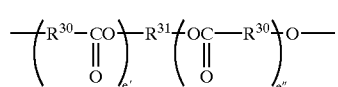

(f)

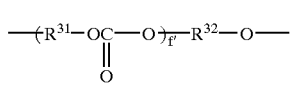

(g)

In formulae (d) through (g), $R^{27}$, $R^{28}$, $R^{29}$, $R^{30}$, $R^{31}$ and $R^{32}$ may be the same or different and are each independently a divalent hydrocarbon group residue having 1 to 20, preferably 2 to 12 carbon atoms. $R^{27}$ through $R^{32}$ are each preferably a straight-chain or branched alkylene groups. Specific examples for $R^{29}$ are methylene, ethylene, trimethylene, tetramethylene, pentamethylene, hexamethylene and propylene groups. Specific examples of $R^{27}$, $R^{28}$, $R^{30}$, $R^{31}$ and $R^{32}$ are ethylene and propylene groups. c' is an integer of 2 to 300, preferably 10 to 200. d' is an integer of 1 to 300, preferably 2 to 200. e' is an integer of 1 to is an integer of 1 to 200, preferably 2 to 200. f' is an integer of 1 to 300, preferably 10 to 200.

In formulae (d) through (g), each of the units may be the same or different. In other words, if there exists a plurality of the groups of $R^{27}$ through $R^{32}$, the groups of each $R^{27}$ through $R^{32}$ may be the same or different.

The polyurethane monomer of formula (4) has a molecular-average molecular weight in the range of 2,500 to 30,000, preferably 3,000 to 20,000 and has preferably 2 to 6, more preferably 2 to 4 functional groups per molecule. The polyurethane monomer of formula (4) may be prepared by any suitable conventional method.

The other eligible polymeric monomers for Component (C) are acryloyl- or methacryloyl-modified polyalkylene oxides (hereinafter referred to as modified alkylene oxides). The polyalkylene oxide encompasses mono-, di- or polyfunctional modified polyalkylene oxides. These may be used singly or in combination. It is particularly preferred to use a monofunctional modified polyalkylene oxide as an essential component in combination with a difunctional modified polyalkylene oxide and/or a polyfunctional polyalkylene oxide. It is particularly preferred to use a mixture of a monofunctional modified polyalkylene oxide and a difunctional modified polyalkylene oxide. Although not restricted, the difunctional modified polyalkylene oxide and/or the polyfunctional polyalkylene oxide should be added in a total amount of 0.1 to 20, preferably 0.5 to 10 parts by weight of 100 parts by weight of the monofunctional modified polyalkylene oxide.

The monofunctional modified polyalkylene oxide is represented by the formula

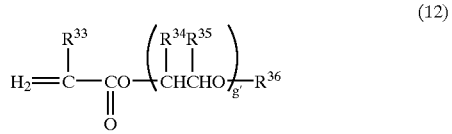

(12)

wherein $R^{33}$, $R^{34}$, $R^{35}$ and $R^{36}$ are each independently hydrogen or an alkyl group having 1 to 5 carbon atoms and g' is an integer of greater than 1.

In formula (18), $R^{33}$, $R^{34}$, $R^{35}$ and $R^{36}$ may be the same or different and are each independently hydrogen or a $C_1$–$C_5$ alkyl group. Specific examples of the alkyl group are methyl, ethyl, i-propyl, n-propyl, n-butyl, t-butyl and n-pentyl groups. It is preferred that $R^{33}$ is hydrogen or methyl group, $R^{34}$ is hydrogen or methyl group, $R^{35}$ is hydrogen or methyl group and $R^{36}$ is hydrogen, methyl or ethyl group.

g' in formula (12) is an integer of greater than 1 and within the range of usually $1 \leq g' \leq 100$, preferably $2 \leq g' \leq 50$, more preferably $2 \leq g' \leq 30$.

Specific examples of the compound of formula (12) are those having 1 to 100, preferably 2 to 50, more preferably 2 to 20 of oxyalkylen units, such as methoxypolyethylene glcyol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof If g' is greater than 2, the monofunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene unit. Specific examples of such copolymers are methoxypoly(ethylene.propylene) glycol methacrylate, ethoxypoly(ethylene.propylene)glycol methacrylate, methoxypoly(ethylene.propylene)glycol acrylate, ethoxypoly(ethylene.propylene)glycol acrylate and mixtures thereof.

The difunctional modified polyalkylene oxide is represented by the formula

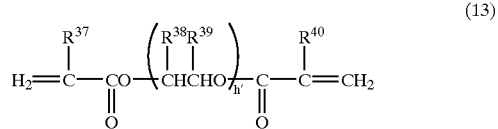

(13)

wherein $R^{37}$, $R^{38}$, $R^{39}$ and $R^{40}$ are each independently hydrogen or an alkyl group having 1 to 5 carbon atoms and h' is an integer of greater than 1.

The polyfunctional modified polyalkylene oxide having more than 3 functional groups is represented by the formula

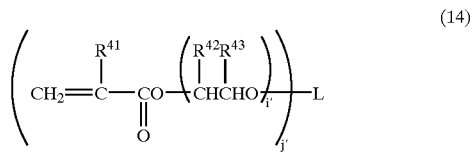

(14)

wherein $R^{41}$, $R^{42}$ and $R^{43}$ are each independently hydrogen or an alkyl group having 1 to 5 carbon atoms, i' is an integer of greater than 1, j' is an integer of 2 to 4 and L is a connecting groups of valence of "q".

In formula (13), $R^{37}$, $R^{38}$, $R^{39}$ and $R^{40}$ may be the same or different and are each independently hydrogen or an alkyl group having 1 to 5 carbon atoms. Specific examples of the alkyl group are methyl, ethyl, i-propyl, n-propyl, n-butyl, t-butyl and n-pentyl groups. It is preferred that $R^{37}$ is hydrogen or methyl group, $R^{38}$ is hydrogen or methyl group, $R^{39}$ is hydrogen or methyl group and $R^{40}$ is hydrogen, methyl or ethyl group.

h' in formula (13) is an integer of greater than 1 and within the range of usually $1 \leq h' \leq 100$, preferably $2 \leq h' \leq 50$, more preferably $2 \leq h' \leq 30$. Specific examples of the compound of formula (13) are those having 1 to 100, preferably 2 to 50, more preferably 2 to 20 of oxyalkylene units, such as polyethylene glycol dimethacrylate, polypropylene glycol dimethacrylate, polyethylene glycol methacrylate, polypropylene glycol dimethacrylate, and mixtures thereof.

If h' is greater than 2, the difunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene unit. Specific examples of such copolymers are poly(ethylene.propylene)glycol dimethacrylate, poly(ethylene.propylene)glycol diacrylate and mixtures thereof.

$R^{41}$, $R^{42}$ and $R^{43}$ in formula (14) are each independently hydrogen or an alkyl group having 1 to 5 carbon atoms. Specific examples of the alkyl group are methyl, ethyl, i-propyl, n-propyl, n-butyl, t-butyl and n-pentyl groups. $R^{41}$, $R^{42}$ and $R^{43}$ are each preferably hydrogen or methyl group.

i' in formula (14) is an integer of greater than 1 and within the range of usually $1 \leq i' \leq 100$, preferably $2 \leq i' \leq 50$, more preferably $2 \leq i' \leq 30$.

j' denotes a number of connecting group "L" and is an integer of $2 \leq j' \leq 4$.

Connecting group "L" is a divalent, trivalent or quatravalent hydrocarbon group having 1 to 30, preferably 1 to 20 carbon atoms. The divalent hydrocarbon group may be alkylene, arylene, arylalkylene and alkylarylene groups and hydrocarbon groups having those groups as a base skeleton. Specific examples of the divalent hydrocarbon group are a methylene group, an ethylene group and a group represented by

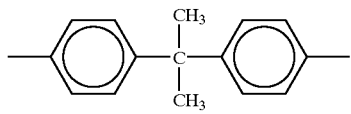

The trivalent hydrocarbon group may be alkyltryl, aryltryl, arylalkyltryl, alkylaryltryl and hydrocarbon groups having those groups as the base skeleton. Specific examples of the trivalent hydrocarbon group are those represented by the following formulae:

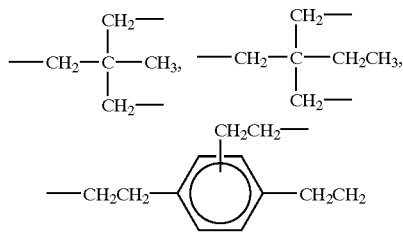

The quatravalent hydrocarbon group may be alkyltetraaryl, aryltetraaryl, arylalkyltetraaryl and alkylaryltetraaryl groups and hydrocarbon groups having these groups as a base skeleton. Specific examples of the quatravalent hydrocarbon groups are those represented by the following formulae:

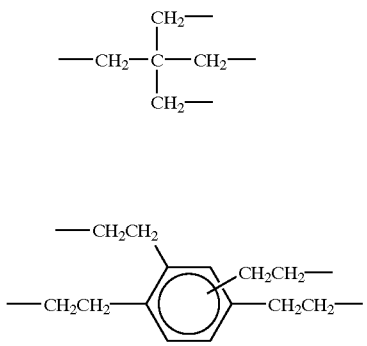

Specific examples of the compound of formula (14) are those having 1 to 100, preferably 2 to 50, more preferably 1 to 20 oxyalkylene units, such as trimethylolpropanetri (polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra(polyethylene glycol methaacrylate), tetramethylolmethanetetra(polypropylene glycol acrylate), tetramethylolmethanetetra(polypropylene glycol methaacrylate), 2,2-bis[4-(acryloxypolyethoxy) phenyl]propane, 2,2-bis[4-(methaacryloxypolyethoxy) phenyl]propane, 2,2-bis[4-(acryloxypolyisopropoxy) phenyl]propane, 2,2-bis[4-(methaacryloxypolyisopropoxy) phenyl]propane and mixtures thereof.

If i' in formula (14) is greater than 2, the compound may be those having different oxyalkylene units from each other, that is, copolymerized oxyalkylene units which result from alternating-, block- or random-copolymerization. Specific examples of such compounds of formula (14) having 1 to 50, preferably 1 to 20 of oxyethylene units and 1 to 50, preferably 1 to 20 of oxypropylene units are trimethylolpropanetri(poly(ethylene.propylene)glycol acrylate), trimethylolpropanetri(poly(ethylene.propylene) glycol methaacrylate), tetramethylolmethanetetra(poly (ethylene.propylene)glycol acrylate), tetramethylolmethanetetra(poly(ethylene.propylene)glycol acrylate) and mixtures thereof.

There may be used the difunctional modified polyalkyleneoxide of formula (13) and the polyfunctional modified polyalkyleneoxide of formula (14) in combination. When these compounds are used in combination, the weight ratio of these compounds is within the range of 0.01/99.9–99.9/0.01, preferably 1/99–99/1, more preferably 20/80–80/20.

The other component of Component (C) is a supporting electrolyte which may be salts, acids and alkalis.

Salts may be inorganic ion salts such as alkali metal salts and alkaline earth metal salts, quaternary ammonium salts and cyclic quaternary ammonium salts. Specific examples of such salts are alkali metal salts of lithium, sodium or potassium, such as $LiClO_4$, $LiSCN$, $LiBF_4$. $LiAsF_6$, $LiCF_3SO_3$, $LiPF_6$, $LiI$, $NaI$, $NaSCN$, $NaClO4$, $NaBF_4$, $NaAsF_6$, $KSCN$ and $KCl$, quaternary ammonium salts such as $(CH_3)_4NBF_4$, $(C_2H_5)_4NBF_4$, $(n-C_4H_9)_4NBF_4$, $(C_2H_5)_4NBR$, $(C_2H_5)_4NClO_4$ and $(n-C_4H_9)_4NClO_4$, and mixtures thereof.

Acids may be inorganic acids or organic acids. Specific examples of the acids are sulfuric acid, hydrochloric acid, phosphoric acids, sulfonic acids and carboxylic acids.

The precursor of a polymeric solid electrolyte referred to as Component (C) is preferably prepared by using a solvent in addition to the above-described polymeric monomer and supporting electrolyte.

Eligible solvents are organic polar solvents such as methanol, ethanol, propylene carbonate, ethylene carbonate, dimethylsulfoxide, dimethoxyethane, acetonitrile, γ-butyrolactone, γ-valerolactone, sulforan, dimethylformamide, dimethoxyethane, tetrahydrofuran, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, γ-butyrolactone, sulforan, dioxolane, dimethylformamide, tetrahydrofuran, adiponitrile, methoxyacetonitrile, dimethylacetoamide, methylpyrrolidinone, dimethylsulfoxide, trimethylphosphate and polyethylene glycol. These organic polar solvents may be used singlely or in combination.

The solvent is added in an amount of 50 to 1,200, preferably 100 to 900, more preferably 200 to 500 parts by weight, per 100 parts by weight of the polymeric monomer. The supporting electrolyte is added in an amount of 0.1 to 30, preferably 1 to 20 weight percent of the solvent.

When the polyurethane monomer of formula (4) is used, the solvent is used in an amount of 100 to 1,200 parts by weight, per 100 parts by weight of the polyurethane monomer. When the modified polyalkyleneoxide of formula (12), (13) or (14), the solvent is used in amount of 50 to 800, preferably 100 to 500 parts by weight, per 100 parts by weight of the modified polyalkyleneoxide.

When the modified polyalkyleneoxide is used, the supporting electrolyte is used in an amount of 1 to 30, preferably 3 to 20 weight percent, of the total weight of the modified polyalkyleneoxide and the solvent.

If necessary, optional components may be added to Component (C) to an extent that the achievement of the purpose of the present invention is not hindered. Such optional components may be polymerization initiator such as photo polymerization initiators and thermal polymerization initiators, cross linking agents, polymers, gelatinizers and other polymeric solid electrolytes.

The photo polymerization initiators may be those which are benzoin-, acetophenone-, benzylketal- or acylphosphineoxide-based. Specific examples of such photo polymerization initiators are acetophenone, benzophenone, 4-methoxybenzophenone, benzoin methyl ether, 2,2-dimethoxy-2-phenyldimethoxy-2-phenylacetophenone, 2-methylbenzoyl, 2-hydroxy-2-methyl-1-phenyl-1-on, 1-(4-isopropylphenyl)-2-hydroxy-2-methylpropane-1-on, triphenylphosphine, 2-chlorothioxantone, 2-hydroxy-2-methyl-1-phenylpropane-1-on, 1-hydroxycyclohexylphenylketone, 2,2-dimethoxy-2-phenylacetophenone, 2-methyl-(4-(methylthio)phenyl)-2-morpholino-1-propanone, 2-benzyl-2-dimethylamino-1-(4-morpholinophenyl)-butane-1-on, 1-(4-(2-hydroxyethoxy)phenyl)-2-hydroxy-2-methyl-1-on, diethoxyacetophenone and 2,4,6-trimethylbenzoyldiphenylphosphineoxide. These may be used in combination.

Eligible thermal polymerization initiators may be selected from know initiators such as peroxide initiators or azo initiators. Specific examples of such peroxide initiators are benzoyl peroxide, methylethyl peroxide, t-butylperoxypivalate and diisopropylperoxycarbonate. Specific examples of such azo initiators are 2,2'-azobis(2-isobutylonitrile), 2,2'-azobisisobutylonitrile, 2,2'-azobis(2, 4-dimethylvaleronitrile) and 1,1'-azobis(cyclohexane-1-carbonitrile). These may be used singly or in combination.

The thermal polymerization initiator is used in an amount of 0.1 to 10, preferably 0.1 to 5 parts by weight, per 100 parts by weight of the polymeric monomer in Component (C).

Eligible polymers are polyacrylonitrile, carboxymethyl cellulose, poly vinyl chloride, polyethylene oxide, polyurethane, polyacrylate, polymethacrylate, polyamide, polyacrylicamide, cellulose, polyester, polypropylene oxide and nation.

Eligible gelatiners are oxyethylene methacrylate, oxyethylene acrylate, urethaneacrylate, acrylicamide and agar-agar.

Eligible polymeric solid electrolytes are polyethylene oxide, a polymer of oxyethylenemethacrylate, nafion, polystyrene sulfonate, $Li_3N$, $Na$-$\beta$-$Al_2O_3$ and $Sn(HPO_4)_2 \cdot H_2O$. Particularly preferred are polymeric solid electrolyte obtained by polymerizing an oxyalkylene(metha)acrylate-based compound or a urethane acrylate-based compound.

The blend ratio between Components (A), (B) and (C) will be described hereinbelow.

Although the blend ratio of each component is arbitrary selected, the amount of Component (A) is preferably selected to an extent that the molar ratio of the polymeric monomer contained in Component (C) to Component (A) (the bipyridinium compound) is maintained to be 10,000/1 to 1/1, preferably 1,000/1 to 5/1, more preferably 100/1 to 10/1.

If the polymeric monomer in Component (C) is the polyfunctional polyalkylene oxide, the weight ratio of Component (A) to the polyfunctional polyalkylene oxide is within the range of 1/0.001 to 1/1, particularly preferably 1/0.05 to 1/0.5.

Component (B) is used in an amount of 1 to 500, preferably 5 to 200, more preferably 10 to 100 millimole.

The term "ultraviolet absorbing compound having an ethylenic double bond" used herein denotes an ultraviolet absorbing compound into which a group having an ethylenic double bond, typically an acryloyl group or a methacryloyl group is introduced (hereinafter referred to as Component (D)).

Although Component (D) is not an essential component of the present invention, the use of Component (D) can prevent the inventive device from deteriorating in electrochromic properties caused by ultraviolet rays.

Component (D) may be a compound having a benzotriazole skeleton represented by formula (15) or (16) or a benzophenon skeleton represented by formula (17) or (18):

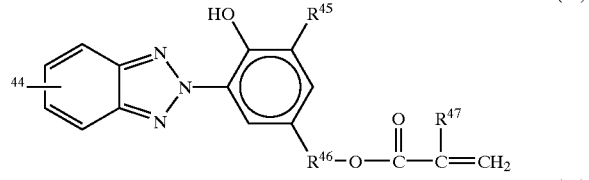

(15)

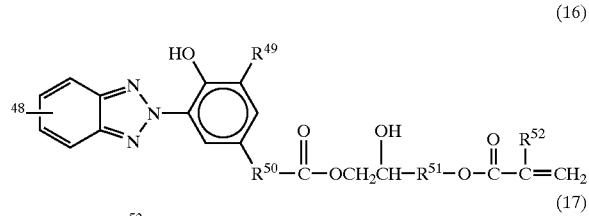

(16)

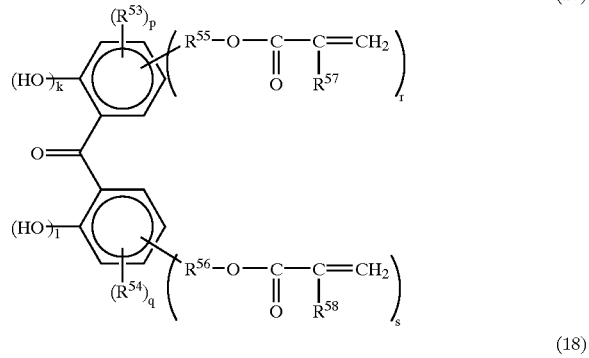

(17)

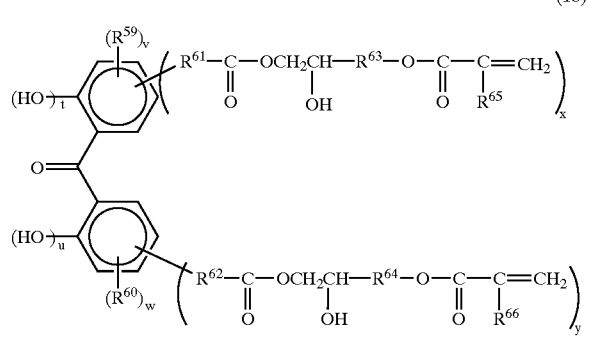

(18)

In formulae (15) through (18), $R^{44}$ and $R^{48}$ are each independently hydrogen, a halogen atom or an alkyl group having 1 to 10, preferably 1 to 6 carbon atoms. Specific examples of the halogen atom are fluorine, chlorine, bromine and iodine. Specific examples of the alkyl group are methyl, ethyl, propyl, i-propyl, butyl, t-butyl and cyclohexyl groups. $R^{44}$ and $R^{48}$ are usually substituted at the 4- or 5-position of the benzotriazole ring but the halogen atom and the alkyl group are usually located at the 4-position. $R^{45}$ and $R^{49}$ are each hydrogen or an alkyl group having 1 to 10, preferably 1 to 6 carbon atoms. Specific examples of the alkyl group are methyl, ethyl, propyl, i-propyl, butyl, t-butyl and cyclohexyl groups. $R^{46}$, $R^{50}$, $R^{61}$ and $R^{62}$ are each independently a $C_1$–$C_{10}$ alkylene group such as ethylene and trimethylene groups. $R^{55}$ and $R^{56}$ each independently indicate a covalent bond or are a $C_1$–$C_{10}$ alkylene group such as ethylene and trimethylene groups, $R^{47}$, $R^{52}$, $R^{57}$, $R^{58}$, $R^{65}$ and $R^{66}$ are each independently hydrogen or methyl group. $R^{51}$, $R^{63}$ and $R^{64}$ are each independently a $C_1$–$C_{10}$ alkylene group such as methylene group. k, l, p, q, r, s, t, u, x and y are each an integer of 0 or 1 and satisfy the conditions of $1 \leq k+l \leq 2$, $1 \leq r+s \leq 2$, $1 \leq t+u \leq 2$ and $1 \leq x+y \leq 2$. p, q, v and w are each an integer of $0 \leq p \leq 3$, $0 \leq q \leq 3$, $0 \leq v \leq 3$ and $0 \leq w \leq 3$.

Specific examples of preferred compounds for Component (D) are as follows and two or more of these compounds may be used in combination:

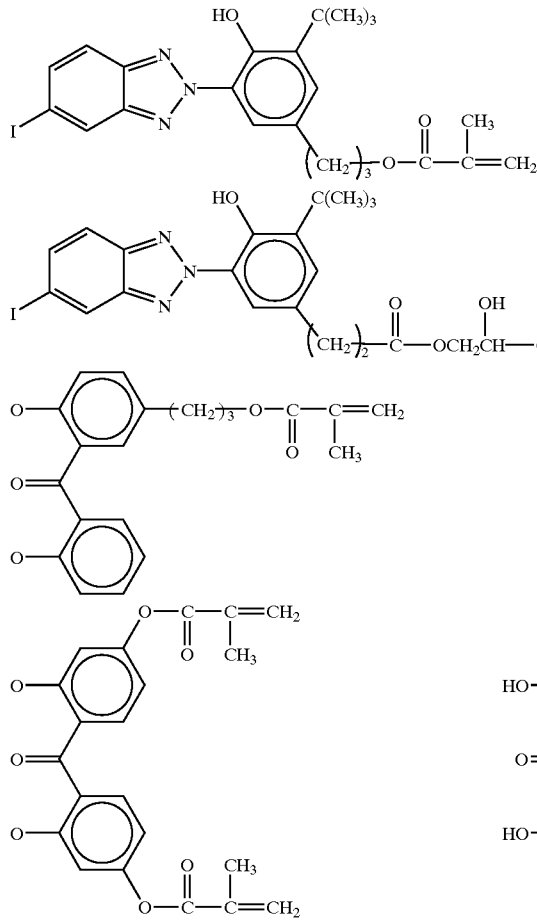

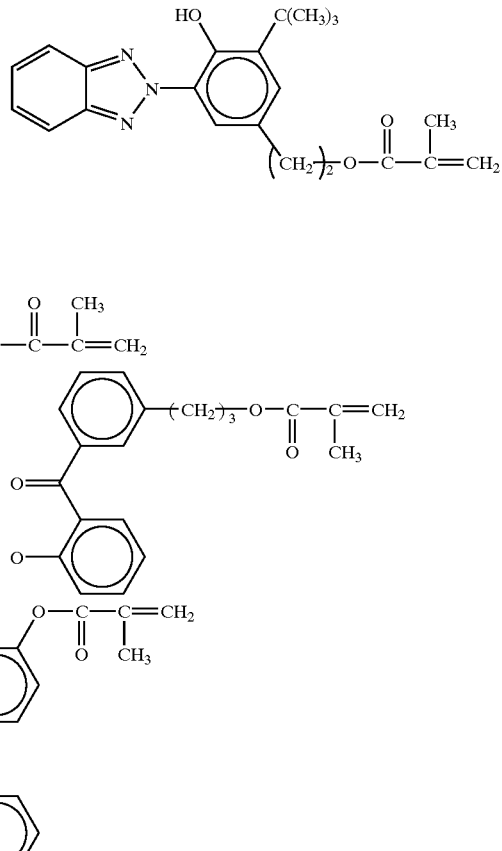

Component (D) is used in an amount of 1 to 500, preferably 5 to 200, more preferably 10 to 100 millimole, per mole of the polymeric monomer in Component (C).

Without using Component (D), it is possible to impart the inventive device with stability against ultraviolet rays by the following method:

(1) mixing a composition containing Components (A), (B) and (C) with an ultraviolet absorbing agent before curing the composition to form an ion conductive layer; and
(2) providing an ultraviolet absorbing layer at any site of the electrochromic device.

When method (1) is employed, the ultraviolet absorbing agent is used in an amount of 0.05 to 40, preferably 0.5 to 20 mass percent of Component (C).

In the case of employing method (2), the ultraviolet absorbing layer may be arranged in any location of the device. For instance, the ultraviolet absorbing layer may be arranged on the outermost surface of the device through which light passes or between the substrate and the electrode layer located on the side of the device subjected to light. The ultraviolet absorbing layer may be formed by any suitable method. For instance, the ultraviolet absorbing layer may be formed by applying an ultraviolet absorbing agent dissolved in a solvent at a selected position and then evaporating out the solvent. Eligible ultraviolet absorbing agents for methods (1) and (2) are compounds having a benzotriazole skeleton or a benzophenone skeleton.

Preferred examples of the compound having a benzotriazole skeleton are those represented by the formula

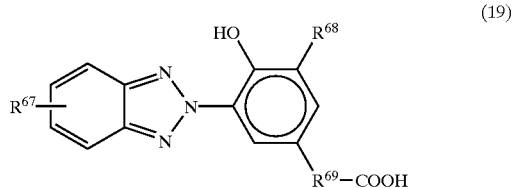

(19)

In formula (19), $R^{67}$ is hydrogen, a halogen atom or an alkyl group having 1 to 10, preferably 1 to 6 carbon atoms. The halogen atom may be fluorine, chlorine, bromine and iodine. Specific examples of the alkyl group are methyl, ethyl, propyl, i-propyl, butyl, t-butyl and cyclohexyl groups. $R^{67}$ is substituted at the 4- or 5-position of the benzotriazole skeleton but the halogen atom or the alkyl group are usually located at the 4-position. $R^{68}$ is hydrogen or an alkyl group having 1 to 10, preferably 1 to 6. Specific examples of the alkyl group are methyl, ethyl, propyl, i-propyl, butyl, t-butyl and cyclohexyl groups. $R^{69}$ is an alkylene group having 1 to 10, preferably 1 to 3 carbon atoms or an alkylidene having 1 to 10, preferably 1 to 3 carbon atoms. Specific examples of the alkylene group are methylene, ethylene, trimethylene and propylene. Specific examples of the alkylidene are ethylidene and propylidene. Specific examples of the compound of formula (19) are 3-(5-chloro-2H-benzotriazole-2-yl)-5-(1,1-dimethylethyl)-4-hydroxy-benzene propanoic acid, 3-(2H-benzotriazole-2-yl)-5-(1,1-dimethylethyl)-4-hydroxy-benzene ethanoic acid, 3-(2H-benzotriazole-2-yl)-4-hydroxybenzene ethanoic acid, 3-(5-methyl-2H-benzotriazole-2-yl)-5-(1-methylethyl)-4-hydroxybenzene propanoic acid,.2-(2'-hydroxy-5'-methylphenyl) benzotriazole, 2-(2'-hydroxy-3',5'-bis(α,α-dimethylbenzyl) phenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole and 3-(5-chloro-2H-benzotriazole-2-yl)-5-(1,1-dimethylethyl)-4-hydroxybenzen propanoic acid octylate.

Preferred examples of the compound having a benzophenone skeleton are those represented by the following formulae:

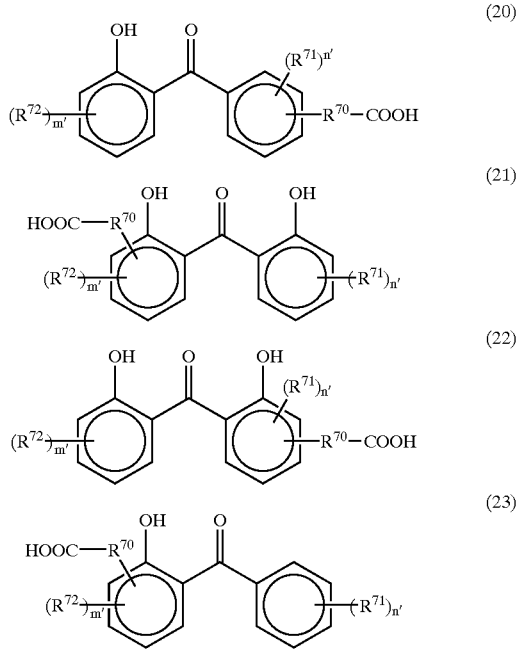

In the above formulae, $R^{71}$ and $R^{72}$ may be the same or different and are each independently a hydroxyl group, an alkyl or alkoxy group having 1 to 10, preferably 1 to 6 carbon atoms. m' and n' are an integer of $0 \leq m' \leq 3$ and $0 \leq n' \leq 3$. Specific examples of the alkyl group are methyl, ethyl, propyl, i-propyl, butyl, t-butyl and cyclohexyl groups. Specific examples of the alkoxy group are methoxy, ethoxy, propoxy, i-propoxy and butoxy groups. R70 is an alkylene group having 1 to 10, preferably 1 to 3 carbon atoms or an alkylidene having 1 to 10, preferably 1 to 3 carbon atoms. Specific examples of the alkylene group are methylene, ethylene, trimethylene and propylene. Specific examples of the alkylidene are ethylidene and propylidene.

Specific examples of the compound having a benzophenone skeleton are 2-hydroxy-4-methoxybenzophenone-5-carboxylic acid, 2,2'-dihydroxy-4-methoxybenzophenone-5-carboxylic acid, 4-(2-hydroxybenzoyl)-3-hydroxybenzene propanoic acid, 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2,2'-dihydroxy-4,4'-dimethoxybenzophenone, 2,2',4,4'-tetrahydroxybenzophenone and 2-hydroxy-4-methoxy-2'-carboxybenzophenone.

The electrochromic device according to the present invention comprises a pair of electrically conductive substrates, at least one of which is transparent, and an ion conductive layer disposed between the substrates, which layer is obtained by curing a composition comprised of Components (A), (B) and (C) and optionally (D). The term "curing" used herein denotes an increase in viscosity brought by chemical reaction. Such chemical reaction may be thermal- or photo-polymerization, polycondensation and cross linking, among which thermal- or photo-polymerization is preferred.

In the case of employing photopolymerization, a photo polymerization initiator is preferably added to Component (C). The type and source of light for photo polymerization are not particularly restricted. Preferred types of light are far ultraviolet rays, ultraviolet rays and visible rays. Preferred light sources are high voltage mercury lamps, fluorescent lamps and xenon lamps. Although not restricted, the photo polymerization is conducted by irradiating light of 100 to 50,000 mJ/cm$^2$, preferably 1,000 to 20,000 mJ/cm$^2$.

In the case of employing thermal polymerization, a thermal polymerization initiator is preferably added to Component (C). Although not restricted, the thermal polymerization is conducted at a temperature of 0 to 130° C., preferably 20 to 80° C. and for 10 minutes to 100 hours, preferably 30 minutes to 40 hours.

The progress of the reaction can be observed by detecting a decrease in double bond with IR or NMR analysis.

Although not restricted, the resulting ion conductive layer has preferably an ion conductivity of greater than 1×10$^{-7}$, preferably greater than 1×10$^{-6}$, more preferably greater than 1×10$^{-5}$ S/cm, at room temperature.

Although not restricted, the ion conductive layer has a thickness of 1 μm to 3 mm, preferably 10 μm to 1 mm.

The ion conductive layer may be formed by any suitable known method. For instance, the ion conductive layer may be formed by curing a composition containing Components (A) through (C) or (A) through (D) alternatively with optional components after being injected into a space between two electrically conductive substrates disposed in opposed relationship and having sealed peripheral edges, by vacuum injection or atmospheric injection or a meniscus method. Alternatively, after the ion conductive layer is formed over the electrode layer of one electrically conductive substrates, this substrate is assembled with the other electrically conductive substrate.

The electrochromic device according to the present invention is characterized by having two electrically conductive substrate, at least one of which is transparent and an ion conductive material layer disposed there between. The basic structure of the device will be described herein below with reference to the annexed drawings.

FIG. 1 shows a device 10 formed by a transparent electrically conductive substrate 11 composed of a transparent substrate 12 and a transparent electrode layer 13 laminated there over, an opaque or transparent substrate 15, a transparent, opaque or reflective electrically conductive substrate 16 laminated over the surface thereof opposing to the transparent electrically substrate 11 and an ion conductive material layer 14 disposed between the transparent electrode layer 13 and the transparent, opaque or reflective electrically conductive substrate 16.

Figure 2:
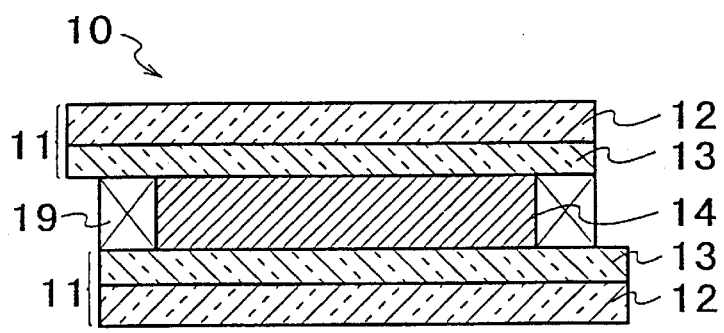
FIG. 2 is a cross-sectional view showing the structure of a smart window according to the present invention.

FIG. 2 shows the structure of an display device or a smart window of the present invention in which an ion conductive material layer 14 is disposed between two transparent electrically conductive substrates 11, 11.

Figure 3:
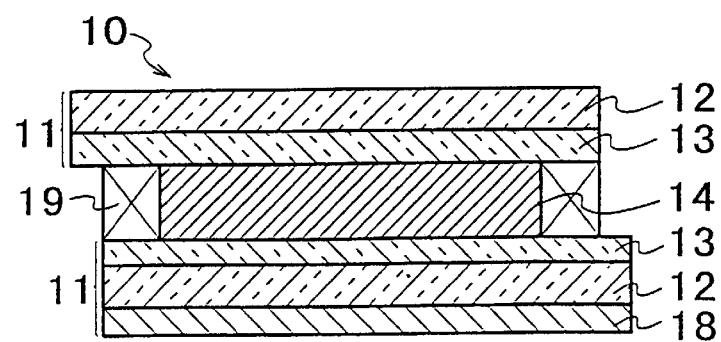
FIG. 3 is a cross-sectional view showing the structure of an electrochromic mirror according to the present invention.

FIG. 3 shows the structure of an electrochromic mirror of the present invention in which an ion conductive material layer 14 is disposed between a transparent electrically conductive substrate 11 composed of a transparent parent substrate 12 over one of which surface a transparent electrode layer 13 is formed and a reflective electrically conductive substrate 17 composed of a transparent substrate 12 over one surface of which a transparent electrode layer 13 is formed and the other surface of which a reflective layer 18, the substrates 11, 17 being placed at a certain interval so that the transparent electrode layers 13, 13 face each other.

The layers forming the device according to the present invention may be prepared by following the above-described methods. For instance, in the case of producing the device as shown in FIG. 1, a transparent electrode layer 13 is formed over a transparent substrate 12 in the foregoing manner thereby obtaining Laminate (A) (transparent electrically conductive substrate 11) and separately a transparent, opaque or reflective electrode layer 16 is formed over a substrate 15 in the foregoing manner thereby obtaining Laminate (B). Consequently, Laminates (A) and (B) are placed in an opposing relationship to each other with a space of 1 to 1,000 μm and the peripheral edges of opposing Laminates (A) and (B) are sealed with a sealant 19, leaving a portion used as an injection port for an ion conductive material thereby obtaining a hallow cell. After the composition containing Components (A) through (C) and optionally Component (D) to be added as required are injected into the cell through the injection port, an ion conductive layer 14 is formed by curing the composition thereby obtaining a device 10.

A spacer may be used in order to keep the space between Laminates (A) and (B) constant upon placing them in an opposing relationship. The spacer may be in the form of beads or sheet formed from glass or polymer. The spacer may be provided by inserting the beads or sheet into the space between the substrates facing each other or by forming protrusions formed from an insulate material such as resin, over the electrode of the electrically conductive substrate.

Although no particular limitation is imposed on a method of curing a composition containing Components (A) through (C) or Components (A) through (D), the composition may be cured by light or heat or by mixing a reactive liquid curing with a lapse of time with composition immediately before injecting the same. The injection port may be sealed in any suitable manner.

Alternatively, Laminate (A') is obtained by forming a transparent electrode layer 13 and an ion conductive material layer 14 in this order over a transparent substrate 12 in the aforesaid manner and separately form this Laminate (B') is obtained by forming an opaque or transparent reflective electrode layer 16 over a substrate 15 in the aforesaid manner. Consequently, Laminates (A') and (B) are placed in an opposing relationship with a spacer with a space of 1 to 1,000 μm so that the ion conductive material layer 14 is contacted with the reflective electrode layer, followed by sealing the peripheral edges with a sealant 19.

In the case of producing the electrochromic smart window as shown in FIG. 2, after two electrically conductive substrates are each prepared by forming a transparent electrode layer 13 over one surface of each of a transparent substrates 12, the smart window is produced by following the procedure as described with respect to the device shown in FIG. 1. In the case of producing the electrochromic mirror as shown in FIG. 3, after a transparent electrically conductive substrate is prepared by forming a transparent electrode layer 13 over one surface of a transparent substrate 12 and a reflective electrically conductive substrate 17 is prepared by forming a transparent electrode layer 13 over one surface of a transparent substrate 12 and a reflective layer 18 over the other surface of the same, the procedure as described with respect to the device shown in FIG. 1 is followed.

The typical examples of structure of the device according to the present invention are as shown in FIGS. 1 through 3. However, the present invention is not restricted to these particular embodiments and thus may further contain another components. Such components are exemplified by an ultraviolet shielding layer such as an ultraviolet reflective layer and an ultraviolet shielding layer and an overcoat layer for protecting the whole mirror layer or each layer of an electrochromic mirror. Such an ultraviolet shielding layer may be arranged on the out side or the transparent electrode layer side of a transparent substrate 12. Such an overcoat layer may be arranged over the outer side of a transparent substrate 12 or a reflective layer 18.

The device according to the present invention is useful as display devices, smart windows, anti-glare mirrors for automobiles or decorative mirrors for indoor use.

The examples which follow are intended as an illustration of certain preferred embodiments of the present invention, and no limitation of the invention is implied.

Example 1

(1) Synthesis of Bipyridiniume Compound

N-n-propylbipyridiniumbromide was obtained by reacting equimolecular amounts of bipyridine and 1-bromopropane in acetone. 5.58 g (20 mmol) of the N-n-propylbipyridiniumbromide were dissolved in 100 ml of 2-propanol and then 3.05 g (20 mmol) of chloromethyl styrene (m- and p-isomers mixture) were added thereto, followed by 24-hour stirring at room temperature thereby obtaining N-n-propyl-N'-vinylbenzylbipyridinium bromide chloride represented by the formula

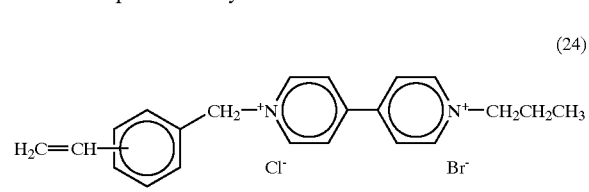

(24)

(2) Synthesis of an Ultraviolet Absorbing Compound Having an Ethylenic Double Bond To a 300 ml three-necked flask was charged with 18.3 g (49 mmol) of a compound of formula (25) shown below, 60 ml of diglyme (diethylene glycol dimethylether) and 0.9 g (7 mmol) of dimethylbenzylamine as a catalyst. A solution was obtained by dissolving 7.7 g (54 mmol) of glycidyl methacrylate of formula (26) shown below in 20 ml diglyme. The solution was added dropwise into the mixture stirred and heated at a temperature of 120° C. in an oil bath, while dried air being blown into the flask. The reaction was continued by stirring and heating for 13 hours. Even after cooling the resulting solution, it was found to contain no insoluble substances and to exhibit transparency.

The solution was poured into methanol to be precipitated. The solid substance thus obtained was vacuum-dried thereby obtaining 18.9 g (37 mmol) of a compound represented by formula (27) shown below:

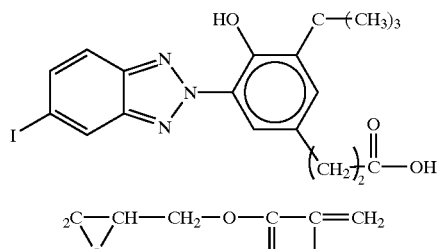

(3) Production of Electrochromic Mirror

A laminate was prepared by forming a thin film of palladium as a highly reflective electrode, over a substrate. An epoxy sealant was applied in the form of lines, along the peripheral edges, except for a portion through which an electrolyte precursor solution is injected, of the palladium film layer of the laminate. A transparent glass substrate coated with $SnO_2$ was superposed over the laminate such that the $SnO_2$ surface and the palladium film layer face each other, and then the epoxy sealant was cured while being pressurized, thereby obtaining a hallow cell with an injection port.

On the other hand, a homogenous solution was obtained by adding 0.4 g of tetrafluoro boric acid to 4.0 g of a mixed solution of 1.0 g of methoxypolyethylene glycol monomethacrylate (the number of oxyethylene unit: 4) manufactured by Shin Nakamura Chemical CO. LTD. under the trade name of ME40GN, 0.02 g of polyethylene glycol dimethacrylate (the number of oxyethylene unit: 9) manufactured by Shin Nakamura Chemical CO. LTD. under the trade name of 9G and 4.0 g of γ-butylolactone. To the homogenous solution was added 0.02 g of 1-(4-isopropylephenyl)-2-hydroxy-2-methylpropane-1-on manufactured by Merck CO., LTD. under the trade name of "Diecure-1116", as a photopolymerization initiator in a dark room and further added 0.078 g (0.180 mmol) of the N-n-propyl-N'-vinylbenzylbipyridinium bromide chloride of formula (24) obtained in the above procedure (1), 0.038 g (0.180 mmol) of the vinylferrocene of formula (28) shown below and 0.095 g (0.184 mmol) of the ultraviolet absorbing compound having an ethylenic double bond of formula (27). The resulting homogenous solution was injected into the cell obtained above through the injection port after being dehydrated.

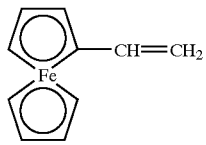

After the injection port was sealed with an epoxy sealant, the solution in the cell was cured by exposing the side of the transparent substrate of the cell to fluorescent light to form an electrochromic polymeric solid electrolyte thereby obtaining an all solid type electrochromic mirror of the structure as shown in FIG. 3.

The mirror when assembled was not colored and had a reflectance of about 80%. The mirror was quick in response to an electric voltage and exhibited excellent electrochromic properties. The mirror was colored upon application of a voltage of 1.2 V and had a reflectance of 10%. Coloring and bleaching operations were repeated every 10 seconds, but no remnant coloration was observed after the lapse of about 200 hours.

Breaking the electrochromic mirror resulted in no scattered or flown out medium, which was sandwiched between the substrates.

Example 2

(1) Synthesis of Bipyridinium Compound 3.12 g (20 mmol) of bipyridine was dissolved in 100 ml of acetonitrile in a flask, followed by addition of 6.10 g (40 mmol) of chloromethyl styrene (m- and p-isomers mixture) and 50 mg (0.45 mmol) of hydroquinone as a polymerization prohibitor.

After the mixture was stirred at room temperature for 24 hours, the precipitated solid substance was filtered and dried thereby obtaining 7.84 g (17 mmol) of N,N'-divinylbenzylbipyridinium dichloride represented by the formula

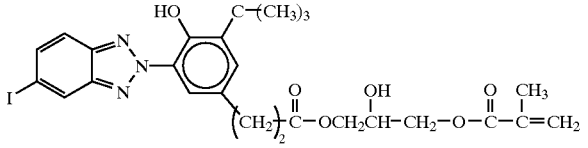

(2) Synthesis of a Ferrocene Compound

To 1.00 g (4.63 mmol) of hydroxymethylferrocene of formula (30) below dissolved in 20 ml of methylene chloride was added dropwise 0.73 g (7.00 mmol) of chloride methacrylate in 5 ml of methylene chloride. The reaction solution was washed with an aqueous solution of NaCl, dilute hydrochloric acid and an aqueous solution of dilute sodium hydroxide and dried over sodium sulfate, followed by distillation of the solvent thereby obtaining 0.97 g (3.4 mmol) of ferrocenylmethyl methacrylate of formula (31):

(30)

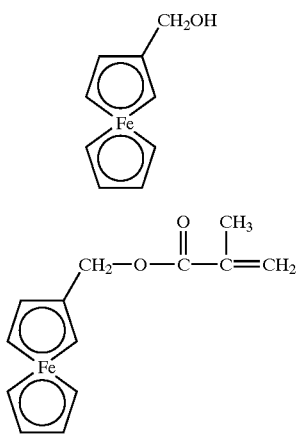

(31)

(3) Production of an Electrochromic Smart Window

A transparent glass substrate was coated with ITO. An epoxy sealant was applied in the form of lines along the peripheral edges, except for a portion to be used for injecting an electrolyte precursor solution, of the ITO layer of the substrate. Over this substrate, another glass substrate coated with ITO was superposed such that their ITO surfaces face each other and then the epoxy sealant was cured with pressurizing thereby producing a hallow cell with an injection port.

On the other hand, a homogenous solution was obtained by adding 0.4 g of lithium perchlorate to 4.0 g of a mixed solution of 1.0 g of methoxypolyethylene glycol monomethacrylate (the number of oxyethylene unit: 4) manufactured by Shin Nakamura Chemical CO., LTD. under the trade name of M40GN, 0.02 g of polyethylene glycol dimethacrylate (the number of oxyethylene unit: 4) manufactured by Shin Nakamura Chemical CO., LTD. under the trade name of 9G and 4.0 g of propylene carbonate. To the homogenous solution was added 0.02 g of 1-(4-isopropylephenyl)-2-hydroxy-2-methylpropane-1-on manufactured by Merck CO., LTD. under the trade name of "Diecure-1116", as a photopolymerization initiator in a dark room and further added 0.085 g (0.184 mmol) of the N,N'-di-vinylbenzylbipyridinium dichloride formula (29) obtained in the above procedure (1), 0.052 g (0.184 mmol) of the ferrocenylmethyl methacrylate of formula (31) obtained in the above synthesis (2) and 0.120 g (0.233 mmol) of the ultraviolet absorbing compound having an ethylenic double bond of formula (27) used in Example 1. The resulting homogenous solution was injected into the cell obtained above through the injection port after being dehydrated.

After the injection port was sealed with an epoxy sealant, the solution in the cell was cured by exposing both the surfaces of the cell to fluorescent light to form an electrochromic polymeric solid electrolyte thereby obtaining an all solid type electrochromic smart window as shown in FIG. 1.

The smart window when assembled was not colored and had a reflectance of about 78%. The smart window was quick in response to an electric voltage and exhibited excellent electrochromic properties. The smart window was colored upon application of a voltage of 1.2 V and had 14% transmittance of 633 nm wavelength light. Coloring and bleaching operations were repeated every 10 seconds, but no remnant coloration was observed even after the lapse of about 200 hours.

Even breaking the electrochromic smart window resulted in no scattered or flown out medium, which was sandwiched between the substrates.

Example 3

(1) Synthesis of Bipyridinium Compound

N-benzylbipyridinium chloride was obtained by reacting equimolecular amounts of bipyridine and 1-benzylchloride in acetone. 5.94 g (21 mmol) of the N-benzylbipyridinium chloride was dissolved in 150 ml of 2-propanol, followed by addition of 3.21 g (21 mmol) of chloromethyl styrene (m- and p-isomers mixture). The mixture was stirred at room temperature for 24 hours thereby obtaining N-benzyl-N'-vinylbenzylbipyridinium chloride. The N-benzyl-N'-vinylbenzylbipyridinium chloride thus obtained was recrystallized from a mixed solution of water-IPA containing $HBF_4$ so as to be anion-exchanged thereby obtaining N-benzyl-N'-vinylbenzylbipyridinium-di(tetrafluoroborate) represented by the formula (32)

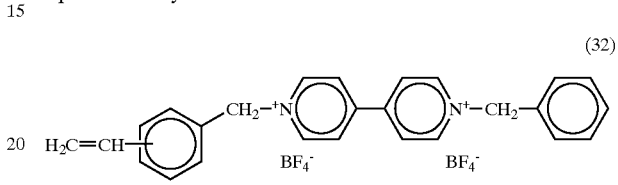

(2) Production of an Electrochromic Mirror

A laminate was prepared by forming a thin film of palladium as a highly reflective electrode, over a substrate. An epoxy sealant was applied in the form of lines along the peripheral edges, except for a portion to used for injecting an electrolyte precursor solution, of the palladium film layer of the laminate. A transparent glass substrate coated with ITO was superposed over the laminate such that the ITO surface and the palladium film layer face each other and then the epoxy sealant was cured with pressurizing thereby forming a hallow cell with an injection port.

On the other hand, a homogenous solution was obtained by adding 0.4 g of lithium perchlorate to 4.0 g of a mixed solution of 1.0 g of methoxypolyethylene glycol monomethacrylate (the number of oxyethylene unit: 4) manufactured by Shin Nakamura Chemical CO., LTD. under the trade name of M40GN, 0.02 g of polyethylene glycol dimethacrylate (the number of oxyethylene unit: 9) manufactured by Shin Nakamura Chemical CO., LTD. under the trade name of 9G and 4.0 g of γ-butylolactone. To the homogenous solution was added 0.02 g of 2,4,6-trimethylbenzoyldiphenylphosphine oxide, as a photopolymerization initiator in a dark room and further added 0.087 g (0.185 mmol) of the N-benzyl-N'-vinylbenzylbipyridinium-di(tetrafluoroborate) of formula (32) obtained in the above procedure (1), 0.039 g (0.185 mmol) of the vinylferrocene of formula (28) and 0.095 g (0.184 mmol) of the ultraviolet absorbing compound having an ethylenic double bond of formula (27). The resulting homogenous solution was injected into the cell obtained above after being dehydrated.

After the injection port was sealed with an epoxy sealant, the solution in the cell was cured by exposing the side of the transparent substrate of the cell to fluorescent light to form an electrochromic polymeric solid electrolyte thereby obtaining an all solid type electrochromic mirror of the structure as shown in FIG. 3.

The mirror when assembled was not colored and had a reflectance of about 80%. The mirror was quick in response to an electric voltage and exhibited excellent electrochromic properties. The mirror was colored upon application of a voltage of 1.1 V and had a reflectance of about 8%. Coloring and bleaching operations were repeated every 10 seconds, but no remnant coloration was observed even after the lapse of about 200 hours.

Breaking the electrochromic mirror resulted in no scattered or flown out medium, which was sandwiched between the substrates to scatter and flow out.

Comparative Example 1

A laminate was prepared by forming a thin film of palladium as a highly reflective electrode, over a substrate. An epoxy sealant was applied in the form of lines along the peripheral edges, except for a portion to used for injecting an electrolyte precursor solution, of the palladium film layer of the laminate. A transparent glass substrate coated with $SnO_2$ was superposed over the laminate such that the $SnO_2$ surface and the palladium film layer face each other and then the epoxy sealant was cured with pressurizing thereby forming a hallow cell with an injection port.

On the other hand, a homogeneous solution was prepared by adding 40.4 g of LiBF to 4.0 g of dimethylsulfoxide. To the homogenous solution were added 0.095 g (0.184 mmol) of N,N'-diheptylbipyridinium bromide and 0.034 g (0.184 mmol) of ferrocene. The resulting homogenous solution was injected into the above-obtained cell through the port after being dehydrated.

The injection port of the cell was sealed with an epoxy sealant thereby obtaining an all solid type electrochromic mirror.

The mirror when assembled was not colored and had a reflectance of about 80%. The mirror was quick in response to an electric voltage and exhibited excellent electrochromic properties. The mirror was colored upon application of a voltage of 1.1 V and had a reflectance of about 10%. However, after coloring and bleaching operations were repeated every 10 seconds, blue remnant coloration around the sealant was observed after the elapse of about 250 hours, which remnant was believed to result from dimerization of viologen.

Breaking the electrochromic mirror resulted in scatter of the medium sandwiched between the substrates.

The electrochromic device according to the present invention is superior in capabilities of avoiding the viologen from precipitation caused by dimerization thereof and resulting in the deterioration of the viologen and electron donating compounds and avoiding the medium from scattering. Furthermore, the electrochromic device according to the present invention can avoid the viologen and electron donating compounds from deterioration caused by being exposed to ultraviolet rays, by using an ultraviolet absorbing compound.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An electrochromic device comprising an ion conductive layer obtained by curing a composition containing (A) a bipyridinium compound represented by formula (1), (B) a metallocene compound represented by formula (2) or (2') and (C) a precursor of a polymeric solid electrolyte comprising a monofunctional modified polyalkylene oxide represented by formula (12), a polymeric monomer selected from the group consisting of a difunctional modified polyalkylene oxide represented by formula (13) and a polyfunctional modified polyalkylene oxide represented by formula (14), and a supporting electrolyte, disposed between two electrically conductive substrates at least one of which is transparent, said formula (1) being

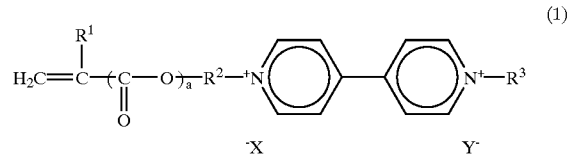

wherein X- and Y- are the same or different and are each independently a counter anion selected from the group consisting of au halogen anion, $ClO_4^-$, $BF_4^-$, $PF_6^-$, $CH_3COO^-$ and $CH_3(C_6H_4)SO_3^-$, $R^1$ is hydrogen or a $C_1$–$C_5$ alkyl group, $R^2$ is a $C_1$–$C_{30}$ divalent hydrocarbon group or oxygen-containing hydrocarbon group, $R^3$ is a $C_1$–$C_{20}$ hydrocarbon or oxygen-containing hydrocarbon group and a is an integer of 0 or 1;

said formulae (2) and (2') being

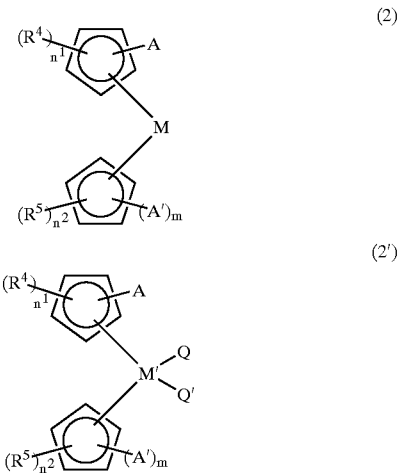

wherein $R^4$ and $R^5$ are each independently a hydrocarbon group selected from the group consisting of alkenyl and aryl groups, if $R^4$ or $R^5$ is an aryl group, the aromatic ring may form a condensation ring by bonding to a cyclopentadienyl ring, $n^1$ is an integer of $0 \leq n^1 \leq 4$, $n^2$ is an integer of $0 \leq n^2 \leq 5$, but at least one of $n_1$ and $n_2$ is $\geq 1$, A and A' are the same or different and are each independently a monovalent group, in is 0 or 1, M is selected from the group consisting of Cr, Go, Fe, Mg, Ni, Os, Ru and V, M' is selected from the group consisting of Hf, Mo, Nb, Ti, V and Zr and Q and Q' are the same or different and each are independently selected from the group consisting of hydrogen, halogen and a $C_1$–$C_{12}$ alkyl group; said formula (A) being

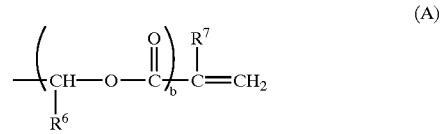

wherein $R^6$ is hydrogen or a methyl group, $R^7$ is hydrogen or at methyl group, b is 0 or 1 and provided that $R^7$ is hydrogen if b is 0;

said formula (12) being

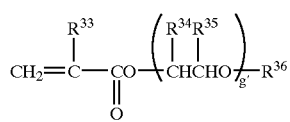
(12)

wherein $R^{33}$, $R^{34}$, $R^{35}$ are each independently hydrogen or an alkyl group having 1 to 5 carbon atoms, $R^{36}$ is an alkyl group having 1 to 5 carbon atoms, and g' is an integer of 1 or greater; said formula (13) being

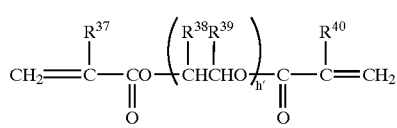
(13)

wherein $R^{37}$, $R^{38}$, $R^{39}$ and $R^{40}$ are each independently hydrogen or an alkyl group having 1 to 5 carbon atoms and h' is an integer of 1 or greater; and said formula (14) being

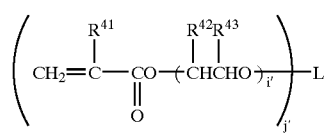
(14)

wherein $R^{41}$, $R^{42}$ and $R^{43}$ are each independently hydrogen or an alkyl group having 1 to 5 carbon atoms, i' is an integer of 1 or greater than 1, j' is an integer of 2 to 4 and L is a connecting group of valence of "j'".

2. The electrochromic device according to claim 1 wherein the ion conductive layer further comprises (D) an ultraviolet absorbing compound having an ethylenic double bond.

3. The electrochromic device according to claim 1 wherein the bipyridinium compound is represented by formula (1) wherein $R^1$ is selected from the group consisting of hydrogen and a methyl group, $R^2$ is selected from the group consisting of methylene, m-phenylene and p-phenylene groups, $R^3$ is selected from the group consisting of methyl, ethyl, i-propyl, n-propyl, n-butyl, t-butyl, n-pentyl, n-hexyl, cyclohexyl, n-heptyl, n-octyl, benzyl and vinylbenzyl groups and groups represented by

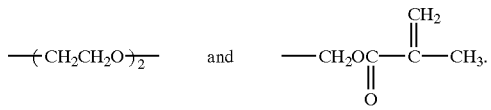

4. The electrochromic device according to claim 1 wherein the metallocene compound is represented by formula (2) or (2') wherein M represents Fe and M' represents Ti or Zr.

5. The electrochromic device according to claim 4 wherein the bipyridinium compound is represented by formula (1) wherein $R^1$ is selected from the group consisting of hydrogen and a methyl group, $R^2$ is selected from the group consisting of methylene, m-phenylene and p-phenylene groups, $R^3$ is selected from the group consisting of methyl, ethyl, i-propyl, n-propyl, n-butyl, t-butyl, n-pentyl, n-hexyl, cyclohexyl, n-heptyl, n-octyl, benzyl and vinylbenzyl groups and groups represented by

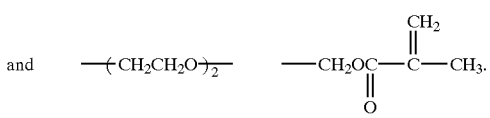

6. The electrochromic device according to claim 5 wherein the bipyridinium compound is N-n-propyl-N'-vinylbenzylbipyridinium bromide chloride.

7. The electrochromic device according to claim 5 wherein the bipyridinium compound is N,N'-divinylbenzylbipyridinium chloride.

8. The electrochromic device according to claim 1 wherein the metallocene compound is represented by formula (2) wherein M represents Fe.

9. The electrochromic device according to claim 1 wherein the precursor of a polymeric solid electrolyte further comprises a solvent.

10. The electrochromic device according to claim 9 wherein the solvent is an organic polar solvent.

* * * * *